US011875940B2

(12) United States Patent
Takaki et al.

(10) Patent No.: US 11,875,940 B2
(45) Date of Patent: Jan. 16, 2024

(54) LIFTING-MAGNET ATTACHMENT MAGNETIC POLE UNIT, STEEL-LIFTING MAGNETIC-POLE-EQUIPPED LIFTING MAGNET, STEEL MATERIAL CONVEYING METHOD, AND STEEL PLATE MANUFACTURING METHOD

(71) Applicant: JFE Steel Corporation, Tokyo (JP)

(72) Inventors: Yuki Takaki, Tokyo (JP); Masaki Kobayashi, Tokyo (JP); Junichi Yotsuji, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 737 days.

(21) Appl. No.: 16/767,200

(22) PCT Filed: Nov. 29, 2018

(86) PCT No.: PCT/JP2018/044025
§ 371 (c)(1),
(2) Date: May 27, 2020

(87) PCT Pub. No.: WO2019/107504
PCT Pub. Date: Jun. 6, 2019

(65) Prior Publication Data

US 2020/0385240 A1 Dec. 10, 2020

(30) Foreign Application Priority Data

Nov. 29, 2017 (JP) ................................ 2017-228619

(51) Int. Cl.
*H01F 7/20* (2006.01)
*B66C 1/06* (2006.01)
(Continued)

(52) U.S. Cl.
CPC ............... *H01F 7/206* (2013.01); *B66C 1/04* (2013.01); *B66C 1/06* (2013.01); *H01F 7/13* (2013.01); *H01F 7/18* (2013.01)

(58) Field of Classification Search
CPC ..... B66C 1/06; B66C 1/04; H01F 7/13; H01F 7/206; H01F 7/18; H01F 3/10
See application file for complete search history.

(56) References Cited

U.S. PATENT DOCUMENTS 4,893,858 A * 1/1990 Yoshitani ................ H01F 7/206
335/291
2020/0385240 A1* 12/2020 Takaki ...................... H01F 3/10

FOREIGN PATENT DOCUMENTS

CN 2130798 Y * 4/1993
CN 200974738 Y 11/2007
(Continued)

OTHER PUBLICATIONS

International Search Report and Written Opinion for International Application No. PCT/JP2018/044025, dated Feb. 12, 2019, 6 pages.
(Continued)

*Primary Examiner* — Mohamad A Musleh
(74) *Attorney, Agent, or Firm* — RatnerPrestia

(57) ABSTRACT

An object is to provide a lifting-magnet attachment magnetic pole unit, a lifting magnet, a steel material conveying method, and a steel plate manufacturing method with which only one or a desired pieces of steel materials can be held. The present invention is a lifting-magnet attachment magnetic pole unit for a lifting magnet used to lift and convey a steel material with magnetic force. The lifting-magnet attachment magnetic pole unit includes a first split magnetic pole that is in contact with an iron core of the lifting magnet and has a branched structure, and a second split magnetic pole that is in contact with a yoke of the lifting magnet and
(Continued)

has a branched structure. The first and second split magnetic poles are alternately arranged.

19 Claims, 12 Drawing Sheets

(51) Int. Cl.
*B66C 1/04* (2006.01)
*H01F 7/13* (2006.01)
*H01F 7/18* (2006.01)

(56) References Cited

FOREIGN PATENT DOCUMENTS

| | | | | | |
|---|---|---|---|---|---|
| CN | 201024036 | Y | | 2/2008 | |
| CN | 201056454 | Y | | 5/2008 | |
| CN | 201056457 | Y | | 5/2008 | |
| CN | 102616626 | B | * | 4/2016 | |
| CN | 109952628 | A | * | 6/2019 | ............ H01H 50/14 |
| DE | 2210193 | A1 | * | 9/1973 | |
| JP | 50160960 | A | | 12/1975 | |
| JP | 51153441 | U | | 12/1976 | |
| JP | 53028265 | A | | 3/1978 | |
| JP | 57175686 | A | | 10/1982 | |
| JP | 59028555 | U | | 2/1984 | |
| JP | 63251139 | A | | 10/1988 | |
| JP | 02295889 | A | | 12/1990 | |
| JP | 07277664 | A | | 10/1995 | |
| JP | 0971383 | A | | 3/1997 | |
| JP | 10194656 | A | | 7/1998 | |
| JP | 2000226179 | A | | 8/1999 | |
| JP | 2007217119 | A | | 8/2007 | |
| JP | 2012158431 | A | * | 8/2012 | |
| JP | 2015027903 | A | * | 2/2015 | |
| KR | 970038908 | U | | 7/1997 | |
| KR | 20030053402 | A | | 6/2003 | |
| KR | 101125280 | B1 | * | 10/2010 | |
| KR | 20110132686 | A | | 12/2011 | |
| KR | 20120073164 | A | | 7/2012 | |
| WO | WO-9716722 | A1 | * | 5/1997 | ............ G01N 27/82 |

OTHER PUBLICATIONS

Extended European Search Report for European Application No. 18 883 651.4, dated Dec. 11, 2020, 7 pages.

Chinese Office Action for Chinese Application No. 201880076571.X, dated Apr. 6, 2021 with Concise Statement of Relevance of Office Action, 9 pages.

Korean Written Decision on Registration for Korean Application No. 10-2020-7015568, dated Jun. 14, 2022, with translation, 4 pages.

Korean Office Action for Korean Application No. 10-2020-7015568, dated Oct. 22, 2021, with Concise Statement of Relevance of Office Action, 6 pages.

Japanese Office Action for Japanese Application No. 2019-510467, dated Mar. 24, 2020, with Concise Statement of Relevance of Office Action, 5 pages.

European Communication pursuant to Article 94(3) for European Application No. 18 883 651.4, dated Aug. 31, 2022, 4 pages.

Chinese Office Action for Chinese Application No. 201880076571.X, dated Nov. 17, 2021 with Concise Statement of Relevance of Office Action, 5 pages.

* cited by examiner (A)

(B)

(A)

(B)

LIFTING-MAGNET ATTACHMENT MAGNETIC POLE UNIT, STEEL-LIFTING MAGNETIC-POLE-EQUIPPED LIFTING MAGNET, STEEL MATERIAL CONVEYING METHOD, AND STEEL PLATE MANUFACTURING METHOD

CROSS REFERENCE TO RELATED APPLICATIONS

This is the U. S. National Phase application of PCT/JP2018/044025, filed Nov. 29, 2018, which claims priority to Japanese Patent Application 2017-228619, filed Nov. 29, 2017, the disclosures of these applications being incorporated herein by reference in their entireties for all purposes.

FIELD OF THE INVENTION

The present invention relates to a lifting-magnet attachment magnetic pole unit used to lift and convey steel materials in such places as steel works and steel plate processing plants, a steel-lifting magnetic-pole-equipped lifting magnet, a steel material conveying method, and a steel plate manufacturing method.

BACKGROUND OF THE INVENTION

Steel materials are lifted and conveyed in a plate mill of a steel works. The process carried out in the plate mill is roughly divided into two steps: a rolling step which involves rolling out a block of steel into a steel plate of a desired thickness; and a finishing step which involves cutting into a shipping size, removing burrs from edges, repairing surface flaws, and inspecting internal flaws. During waiting for the finishing step and during waiting for shipment after the finishing step, steel plates are stored in stacks of several to more than a dozen pieces for space saving. In the following description, steel plates may be simply referred to as steel materials.

Typically, the finishing step and the shipment or transfer operation involve lifting and moving only one or more (e.g., two or three) intended pieces of plate from the storage area using an electromagnetic lifting magnet attached to a crane. However, attempting to lift a thin steel material (with a plate thickness of about 20 mm or less) using the lifting magnet typically used in the steel works leads to attracting unnecessary steel materials stacked underneath the steel material to be lifted. The unnecessary steel materials attracted here need to be dropped by controlling the amount of current in the lifting magnet or by turning on and off the power, so as to adjust the number of plates to be attracted. Depending on the skill of the operator who operates the crane, the operation may need to be redone many times and this leads to significant loss of work efficiency. Also, the operation involving adjusting the number of plates to be attracted, as described above, has been a significant hindrance to automating the crane operation.

As a method for controlling the number of steel materials to be lifted using an apparatus with a lifting magnet, for example, Patent Literature 1 and Patent Literature 4 each describe a method that controls lifting force by controlling current applied to a coil of the lifting magnet. As a method for increasing the attracting force of a lifting magnet, for example, Patent Literature 2 describes a technique that uses a lifting magnet having a plurality of small permanent magnets. As a method relating to automation of operation, for example, Patent Literature 3 describes a technique that uses a lifting magnet having a plurality of small electromagnetic magnets that are excited independently.

PATENT LITERATURE

PTL 1: Japanese Unexamined Patent Application Publication No. 2-295889

PTL 2: Japanese Unexamined Patent Application Publication No. 7-277664

PTL 3: Japanese Unexamined Patent Application Publication No. 2000-226179

PTL 4: Japanese Unexamined Patent Application Publication No. 1998-194656

SUMMARY OF THE INVENTION

FIG. 12 is a cross-sectional view illustrating an internal structure of a typical electromagnetic lifting magnet. The typical electromagnetic lifting magnet (hereinafter, a typical lifting magnet will be simply referred to as a lifting magnet) has an internal coil 103 with a diameter of one hundred to several hundred mm. An iron core (inner pole) 101 is mounted inside the coil 103 and a yoke (outer pole) 102 for transmitting a magnetic field is mounted outside the coil 103. By bringing the inner pole 101 and the outer pole 102 into contact with a steel material, with the coil 103 being in an energized state, a magnetic field circuit is formed and the steel material is attracted to the lifting magnet.

To produce sufficient lifting force, a lifting magnet typically used in a plate mill is configured such that a single large coil produces a magnetic flux and inputs (applies) a large magnetic flux to a steel material, and is designed such that the magnetic flux density passing through the inner pole is about 1 T (=10000 G). However, in the method where a large magnetic flux is applied from one point, magnetic flux saturation occurs in the uppermost piece of steel materials if the steel materials have a relatively thin plate thickness of 20 mm or less. Then, a plurality of plates are simultaneously attracted to the lifting magnet and this leads to a loss of efficiency in conveying steel materials and poses a significant hindrance to automating the crane operation.

Also, controlling the number of plates attracted to the lifting magnet requires controlling the penetration depth to which the magnetic flux reaches in stacked steel materials, in accordance with the plate thickness of the steel materials and the number of steel materials to be lifted.

For the problem of magnetic flux saturation in the uppermost piece of steel material, the technique described in Patent Literature 1 is also effective, which controls current to be applied. However, in the plate mill, where various steel materials of different magnetic characteristics and plate thicknesses are handled, it is necessary to accurately control the current value for each steel material to be lifted, and this requires a control mechanism for accurately keeping the current constant. Sensing of the plate thickness of steel materials to be lifted is also required. This requires sensors and related equipment and leads to increased initial introduction costs.

The technique described in Patent Literature 2 uses permanent magnets, with which producing large attracting force is typically more difficult than with electromagnetic lifting magnets. Therefore, it is difficult to apply this technique to a lifting magnet used to transport steel materials that weigh several tons (t) to several tens of tons (t) in the plate mill of the steel works.

The technique described in Patent Literature 3 requires a smaller coil to be mounted on each of small magnetic poles.

For transporting steel materials weighing several tons (t) to several tens of tons (t), however, the small coil needs to be designed such that its attracting force is equivalent to that of a large coil. The attracting force of a coil can be determined roughly by (attracting area)×(square of the number of coil turns)×(square of current). If the size of the coil is reduced by reducing the number of turns without changing the diameter of the coil copper wire, it is necessary to increase either the attracting area or the current value. Increasing the attracting area increases the weight of the lifting magnet and this leads to an increase in load on the crane. Increasing the current value increases the amount of heat generated by the coil and this poses a risk of burn-damage to the coil. However, even when the diameter of the coil copper wire is reduced to maintain the number of turns without changing the attracting area and the current, an increase in electrical resistance of the coil increases power consumption and heat generation, and this poses a risk of burn-damage to the coil.

For controlling the penetration depth to which the magnetic flux reaches in stacked steel materials, the technique described in Patent Literature 4 is also effective. Patent Literature 4 presents a method that controls the output of magnetic flux by controlling current in the coil and changes the penetration depth of the magnetic flux. However, a lifting magnet typically used in the plate mill of the steel works is designed such that a large magnetic pole can apply a large amount of magnetic flux to steel materials, and the maximum penetration depth of magnetic flux is large, as described below. Therefore, the penetration depth of magnetic flux changes significantly in response to a small change in current. If steel materials to be lifted are of a thin plate thickness, the number of steel materials to be lifted cannot be properly controlled because of gaps created by warpage or errors of the magnetic flux sensor. Therefore, it is difficult to apply the technique of Patent Literature 4 to a lifting magnet used to transport steel materials weighing several tons (t) to several tens of tons (t) in the plate mill of the steel works.

The technique described in Patent Literature 3 is a method that changes the penetration depth of magnetic flux by varying the size of an electromagnet. However, to exert attracting force equivalent to that when one large magnetic pole is attached to a lifting magnet, it is necessary to make the total area of magnetic poles and the output magnetic flux density substantially the same as those in the electromagnet having a large coil. To maintain the total area of magnetic poles, it is necessary to attach many small electromagnets to the lifting magnet. However, it is difficult to reduce the size of the coil to maintain the output magnetic flux density. This causes another problem of an increase in the weight of the entire lifting magnet. This is because the output magnetic flux density is substantially proportional to (number of coil turns)×(current). To reduce the coil size, it is necessary to either reduce the wire diameter of the coil or reduce the number of coil turns to increase current. The former case increases the electrical resistance of the coil, and the latter case is not realistic because an increase in heat generation resulting from an increase in current poses a risk of burn-damage to the coil.

Aspects of the present invention have been made in view of the circumstances described above. An object according to aspects of the present invention is to provide a lifting-magnet attachment magnetic pole unit, a steel-lifting magnetic-pole-equipped lifting magnet, a steel material conveying method, and a steel plate manufacturing method with which only one or a desired number of steel materials can be held.

Note that "lifting-magnet attachment magnetic pole unit" according to aspects of the present invention refers to one that is attached to a lifting magnet and serves as part of a magnetic field circuit of the lifting magnet.

To solve the problems described above, the present inventors examined techniques for lifting only a desired one piece of steel materials (e.g., steel plates) stacked in layers. The present inventors then found out that by applying a magnetic flux from the inner pole of the lifting magnet to steel materials in a dispersed form without reducing the amount of magnetic flux, the magnetic flux density in the uppermost piece of steel material was reduced and the occurrence of magnetic flux saturation was avoided. The present inventors also found out that since the amount of magnetic flux applied to steel materials was not changed, there was no reduction in attracting force and the uppermost piece of steel material was strongly attracted.

Additionally, the present inventors examined techniques for lifting only some (e.g., two or three) desired pieces of steel materials (e.g., steel plates) stacked in layers. The present inventors then found out that by changing the magnetic field circuit, it was possible to change the maximum penetration depth of magnetic flux and control the number of steel materials to be lifted even if the steel materials were of a thin plate thickness.

Aspects of the present invention are based on these findings and are summarized as follows.

[1] A lifting-magnet attachment magnetic pole unit for a lifting magnet used to lift and convey a steel material with magnetic force includes a first split magnetic pole that is in contact with an iron core of the lifting magnet and has a branched structure, and a second split magnetic pole that is in contact with a yoke of the lifting magnet and has a branched structure. The first and second split magnetic poles are alternately arranged.

[2] In the lifting-magnet attachment magnetic pole unit according to [1], the first split magnetic pole has dimensions satisfying Inequality (1):

$$S \times B < L \times t \times B_S \qquad \text{Inequality (1)}$$

where

S is a cross-sectional area ($mm^2$) of an inner pole of the lifting magnet;

B is a mean magnetic flux density (T) inside the inner pole of the lifting magnet;

L is a total perimeter (mm) of the first split magnetic pole in a region where the first split magnetic pole is in contact with a lifted steel material;

t is a plate thickness (mm) of the lifted steel material; and $B_S$ is a saturation magnetic flux density (T) in the lifted steel material.

[3] In the lifting-magnet attachment magnetic pole unit according to [1] or [2], the first split magnetic pole includes at least one movable magnetic pole and a fixed magnetic pole in a region adjacent to the movable magnetic pole, the fixed magnetic pole being disposed on a surface in contact with the steel material.

[4] In the lifting-magnet attachment magnetic pole unit according to [3], the movable magnetic pole is of a movable type.

[5] In the lifting-magnet attachment magnetic pole unit according to [3] or [4], the fixed magnetic pole has dimensions satisfying Inequality (2):

$$S \times B < L_1 \times t_1 \times B_S \qquad \text{Inequality (2)}$$

where

S is a cross-sectional area ($mm^2$) of an inner pole of the lifting magnet;

B is a mean magnetic flux density (T) inside the inner pole of the lifting magnet;

$L_1$ is a total perimeter (mm) of the fixed magnetic pole in a region where the fixed magnetic pole is in contact with a lifted steel material;

$t_1$ is a maximum sum (mm) of plate thicknesses of steel materials lifted by the fixed magnetic pole; and $B_S$ is a saturation magnetic flux density (T) in the lifted steel materials.

[6] In the lifting-magnet attachment magnetic pole unit according to any one of [1] to [5], a distance between the first and second split magnetic poles alternately arranged is 30 mm or less.

[7] In the lifting-magnet attachment magnetic pole unit according to any one of [1] to [6], the first and second split magnetic poles each have a plate thickness of 20 mm or less.

[8] A steel-lifting magnetic-pole-equipped lifting magnet used to lift and convey a steel material with magnetic force includes, as the magnetic pole, the lifting-magnet attachment magnetic pole unit according to any one of [1] to [7].

[9] A steel material conveying method using the lifting-magnet attachment magnetic pole unit according to any one of [1] to [7] includes attaching the lifting-magnet attachment magnetic pole unit to a lifting magnet, and lifting and conveying a steel material with magnetic force.

[10] A steel material conveying method using the steel-lifting magnetic-pole-equipped lifting magnet according to [8] includes lifting and conveying a steel material with magnetic force.

[11] A steel plate manufacturing method includes conveying a steel plate using the steel material conveying method according to [9] or [10] after rolling, and carrying out a finishing step.

When only one steel material is to be lifted, aspects of the present invention can prevent the occurrence of magnetic flux saturation in the uppermost piece of steel materials stacked in layers. Therefore, even when the steel materials are of a plate thickness of 20 mm or less, only the uppermost piece of those stacked in layers can be easily lifted with the magnetic-pole-equipped lifting magnet. Additionally, since the entire magnetic flux produced in the coil can be used to lift the steel material at the top, larger lifting force can be exerted with the same power consumption as a typical lifting magnet.

When only a desired number of (or several) steel materials are to be lifted, aspects of the present invention can change the maximum penetration depth of magnetic flux to a desired value by changing the magnetic field circuit. Thus, even when objects to be lifted are steel materials of a thin plate thickness (i.e., thin steel materials), the number of steel materials to be lifted can be controlled with high accuracy.

BRIEF DESCRIPTION OF THE DRAWINGS

FIG. 1(A) is a plan view of the steel materials as viewed from above, and FIG. 1(B) is a side cross-sectional view of the steel materials (or cross-sectional view taken along line X-X' in FIG. 1(A)).

FIG. 2(A) is a plan view of the steel materials as viewed from above, and FIG. 2(B) is a side cross-sectional view of the steel materials (or cross-sectional view taken along line Y-Y' in FIG. 2(A)).

DETAILED DESCRIPTION OF EMBODIMENTS OF THE INVENTION

Embodiments of the present invention will now be described with reference to the drawings. Note that the present invention is not limited to embodiments to be described.

First Embodiment

A lifting-magnet attachment magnetic pole unit according to a first embodiment is a lifting-magnet attachment magnetic pole unit for a lifting magnet used to lift and convey a steel material with magnetic force. The lifting-magnet attachment magnetic pole unit includes a first split magnetic pole that is in contact with an iron core of the lifting magnet and has a branched structure, and a second split magnetic pole that is in contact with a yoke of the lifting magnet and has a branched structure. The first and second split magnetic poles are alternately arranged. The dimensions of the first split magnetic pole may satisfy Inequality (1) described below. The distance between the first and second split magnetic poles alternately arranged may be 30 mm or less. The first and second split magnetic poles may each have a plate thickness of 20 mm or less.

A steel-lifting magnetic-pole-equipped lifting magnet according to the first embodiment is a magnetic-pole-equipped lifting magnet used to lift and convey a steel material with magnetic force. The steel-lifting magnetic-pole-equipped lifting magnet includes the iron core and the yoke disposed opposite each other, with a coil interposed therebetween, the first split magnetic pole in contact with the iron core and having a branched structure, and the second split magnetic pole in contact with the yoke and having a branched structure. The first and second split magnetic poles are alternately arranged. The dimensions of the first split magnetic pole may satisfy Inequality (1) described below. The distance between the first and second split magnetic poles alternately arranged may be 30 mm or less. The first and second split magnetic poles may each have a plate thickness of 20 mm or less.

Figure 2:
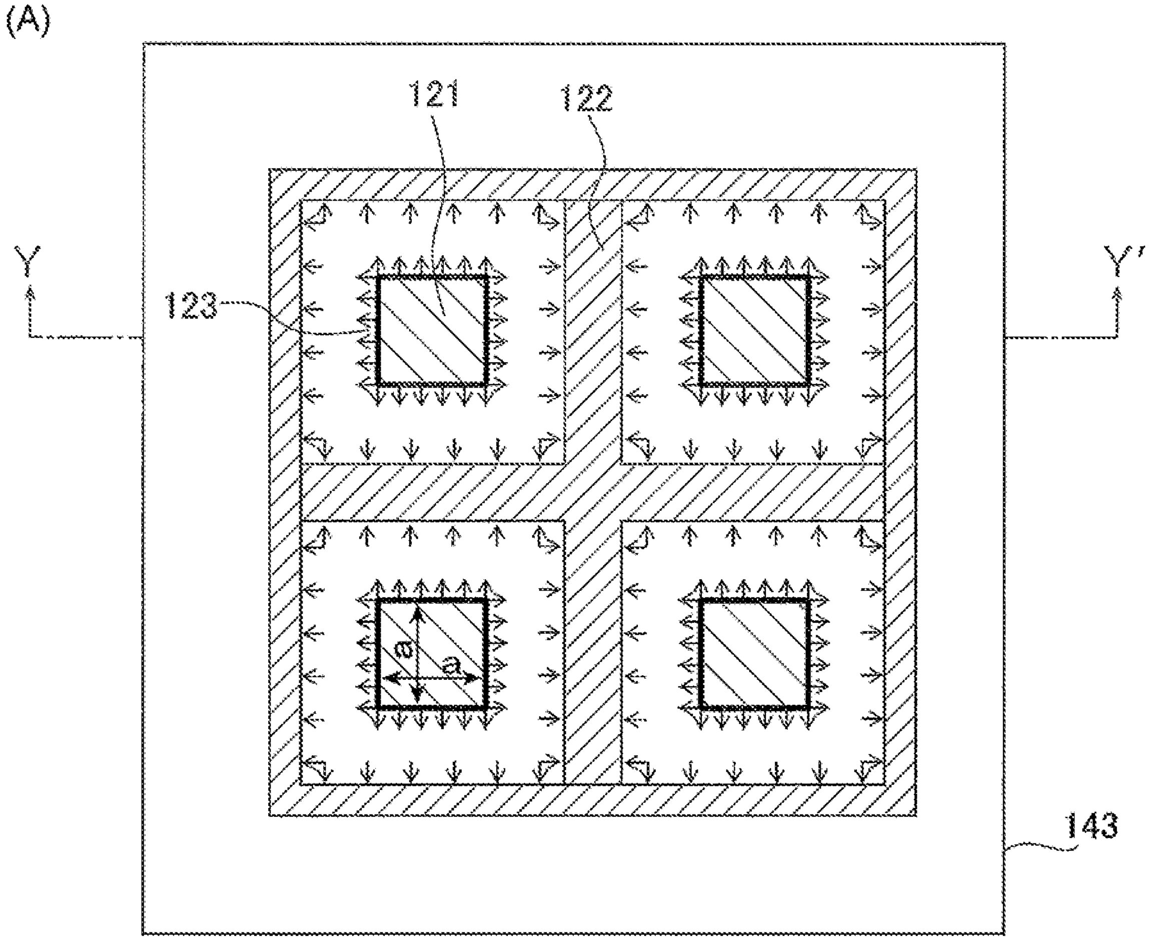
FIG. 2 illustrates how magnetic flux flows in steel materials lifted by split smaller lifting magnets.
Figure 2:
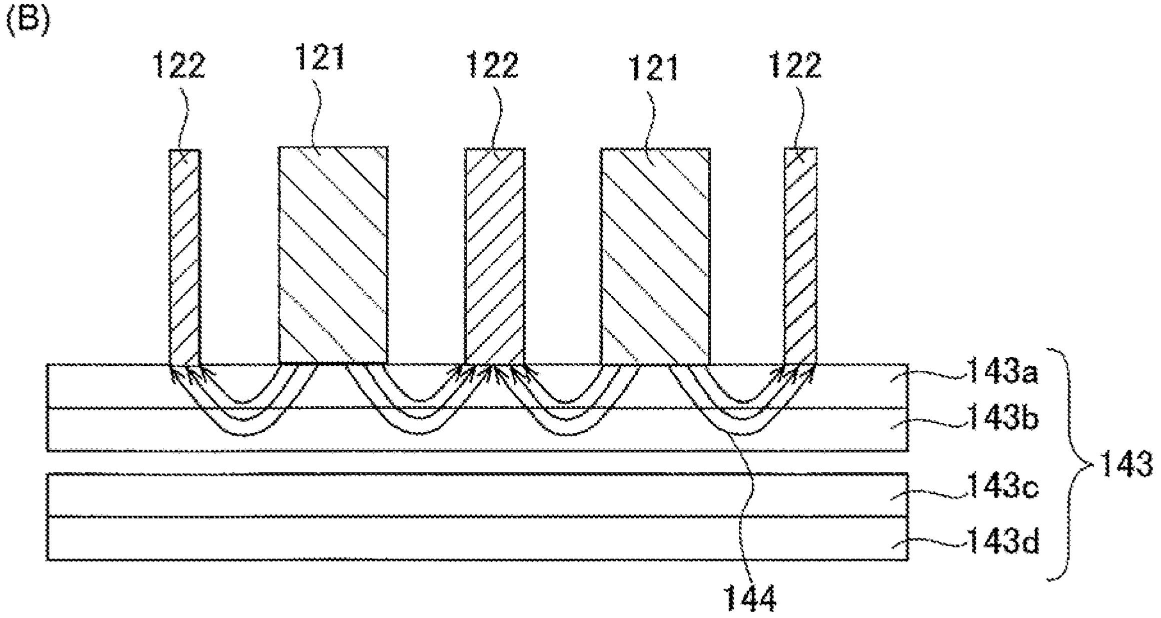
Figure 3:
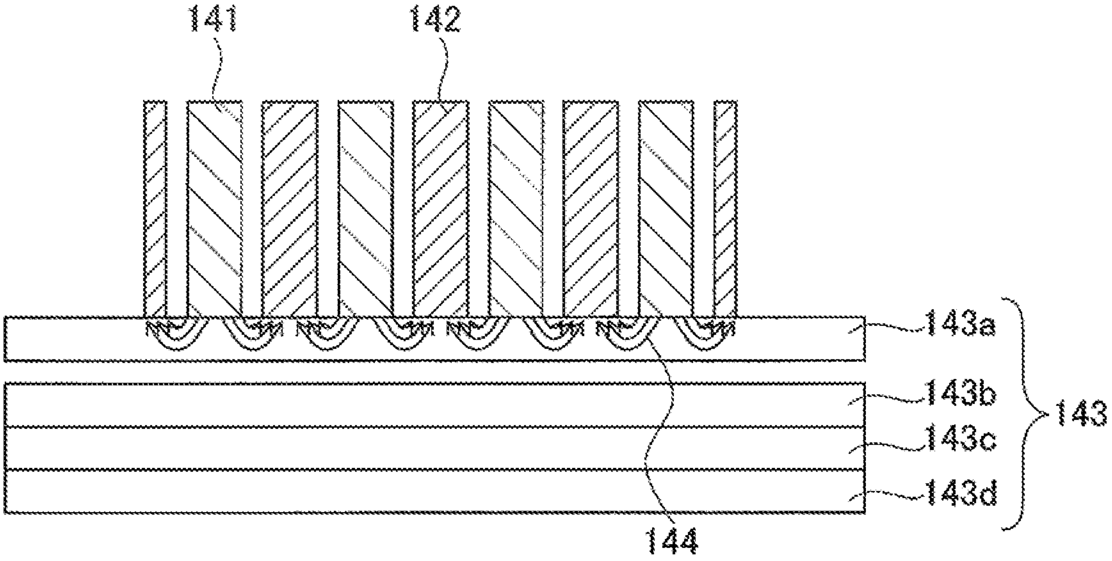
FIG. 3 is a cross-sectional view illustrating how magnetic flux produced by a plurality of small lifting magnets flows in a steel material.

First, with reference to FIG. 1 to FIG. 3, a technical idea according to aspects of the present invention will be described in detail.

Figure 1:
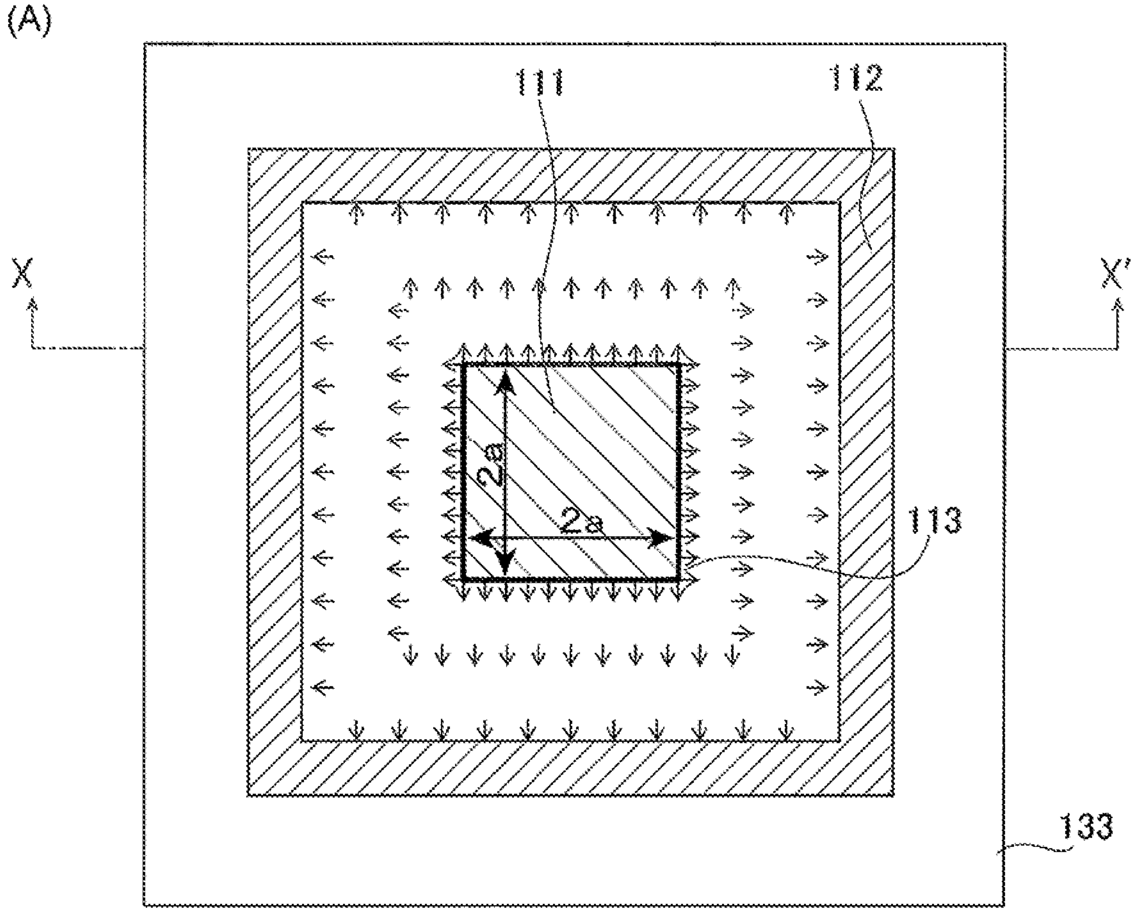
FIG. 1 illustrates how magnetic flux flows in steel materials lifted by one lifting magnet.
Figure 1:
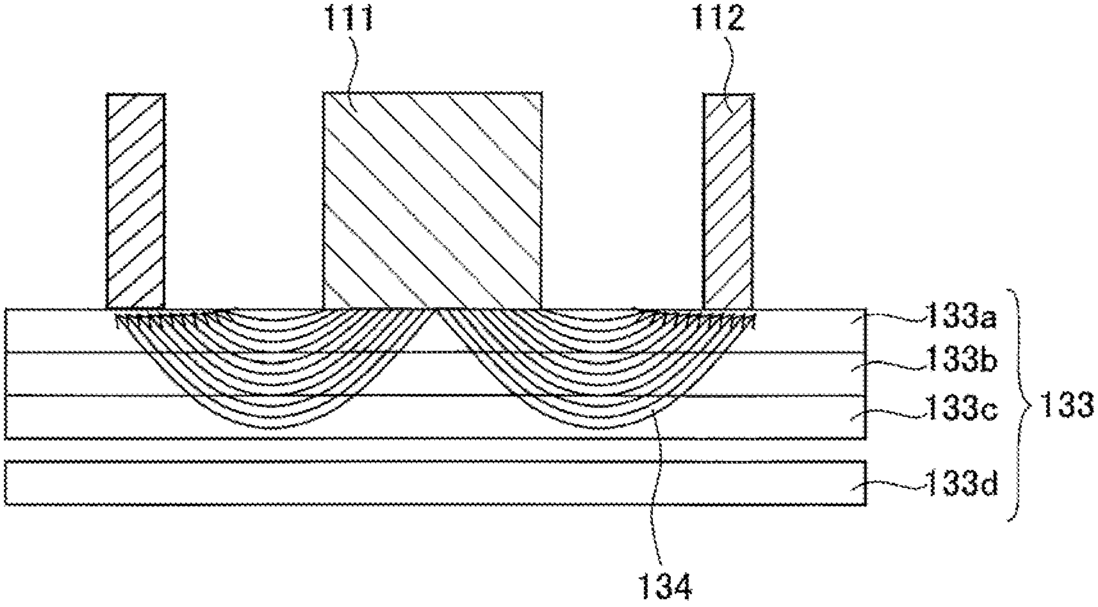

FIG. 1 is a diagram illustrating how magnetic flux flows in steel materials lifted by a typical lifting magnet (which is an electromagnetic lifting magnet here). Specifically, FIG. 1(A) is a plan view of the steel materials lifted using one lifting magnet, as viewed from above, and FIG. 1(B) is a side cross-sectional view of the steel materials (or cross-sectional view taken along line X-X' in FIG. 1(A)). FIG. 2 is a diagram illustrating how magnetic flux flows in steel materials lifted by smaller lifting magnets into which the lifting magnet described above is divided. Specifically, FIG. 2(A) is a plan view of the steel materials lifted using four separate smaller lifting magnets, and FIG. 2(B) is a side cross-sectional view of the steel materials (or cross-sectional view taken along line Y-Y' in FIG. 2(A)). FIG. 3 is a side cross-sectional view of the steel materials and the lifting magnets, with the steel materials being in a lifted state. Note that arrows in the drawings indicate how magnetic flux flows. The lifting magnets (electromagnetic lifting magnets) illustrated in FIGS. 2 and 3 have the same structure as that illustrated in FIG. 1.

As described above, the first embodiment of the present invention, where only the uppermost piece of steel material can be easily lifted, is completed by solving the problem of magnetic flux saturation in the uppermost piece of steel material. The reason for saturation of magnetic flux in the uppermost piece of steel material will now be described with reference to FIGS. 1 and 2.

A typical electromagnetic lifting magnet has an internal coil with a diameter of one hundred to several hundred mm. An iron core (inner pole) is mounted inside the coil, and a yoke (outer pole) for transmitting a magnetic field is mounted outside the coil. As illustrated in FIG. 1(B), in a steel material 133 lifted by the lifting magnet, a magnetic flux applied from an iron core 111 (inner pole) is diffused from the bottom of the inner pole 111 and travels toward the bottom of a yoke 112 (outer pole). In this case, a region directly below the outer periphery of the inner pole 111 is a neck portion 113 of the magnetic flux diffusion, that is, a portion where the magnetic flux density is highest in the steel material. In the case of FIG. 1(A), the inner pole 111 measuring 2a long×2a wide is used, and the neck portion 113 has a cross-sectional area of (perimeter of inner pole 111)×(plate thickness of steel material), that is, 8a×(plate thickness of steel material). As illustrated in FIG. 1(B), a magnetic flux 134 diffused from the inner pole 111 toward the outer pole 112 is large in amount in the neck portion 113. The magnetic flux 134 reaches not only a steel material 133*a* at the top, but also two pieces of steel material 133*b* and 133*c* underneath. The present inventors focused on the correlation between the size of the neck portion 113 and the magnetic flux density and carried out further studies. The present inventors then found out that reducing the size of the inner pole was effective in reducing the magnetic flux density. Inner poles with a smaller size are illustrated in FIG. 2.

As illustrated in FIG. 2(A), in a steel material lifted by lifting magnets with four split inner poles made smaller in size, a magnetic flux applied from each iron core 121 (inner pole) is diffused from the bottom of the inner pole 121 and travels toward the bottom of a yoke 122 (outer pole) located outside the inner pole 121. In this case, a region directly below the outer periphery of each inner pole 121 is a neck portion 123 of the magnetic flux diffusion, that is, a portion where the magnetic flux density is highest in the steel material. In the case of FIG. 2(A), four small inner poles 121, each measuring "a" long×"a" wide, are used, which are obtained by dividing the inner pole 111 illustrated in FIG. 1(A) into halves both lengthwise and widthwise. The sum of the cross-sectional areas of the four neck portions 123 in this case is (total perimeter of inner poles 121)×(plate thickness of steel material), that is, (4a×4)×(plate thickness of steel material)=16a×(plate thickness of steel material). In each neck portion 123, as illustrated in FIG. 2(B), a magnetic flux 144 diffused from the inner pole 121 toward the outer pole 122 therearound is limited in amount. The magnetic flux 144 reaches only a steel material 143*a* at the top and a steel material 143*b* underneath. When the inner pole is divided into a plurality of smaller magnetic poles (inner poles 121) and used for lifting, a portion (neck portion) where the magnetic flux density is highest in the steel material is divided into a plurality of neck portions 123, which have a larger total cross-sectional area. The neck portions 123 thus have a lower magnetic flux density, and this reduces the occurrence of magnetic flux saturation in the uppermost piece of steel material.

However, if a plurality of inner poles simply reduced in size is used in an attempt to exert lifting force equivalent to that of a large lifting magnet, other issues may arise, which include an increase in the weight of the lifting magnets and an increase in heat generation in the coils.

Accordingly, the present inventors carried out further studies to solve the issues resulting from size reduction of the inner pole. As described with reference to FIG. 1(B), when the inner pole 111 having a large size is used to lift the uppermost piece of the steel materials 133*a* to 133*d* stacked in layers, a large amount of magnetic flux 134 is diffused from the inner pole 111 toward the outer pole 112 and magnetic flux saturation occurs in the steel material 133*a* at the top. The magnetic flux 134 then reaches the underneath steel materials 133*b* and 133*c*. On the other hand, when, as illustrated in FIG. 3, a plurality of smaller split inner poles 141 and outer poles 142 are used to lift the uppermost piece of the steel materials 143*a* to 143*d* stacked in layers, the magnetic flux 144 diffused from each inner pole 141 to adjacent ones of the outer poles 142 is limited in amount and magnetic flux saturation does not occur in the steel material 143*a* at the top. The magnetic flux 144 does not reach the underneath steel materials 143*b* to 143*d*. The present inventors thus found out that when a magnetic flux was produced by one large coil and input to a steel material by branched inner and outer poles, a magnetic flux diffusion effect was achieved and the problems described above were solved. Therefore, it is possible to avoid magnetic flux saturation in the steel material while avoiding an increase in the weight of the lifting magnet and an increase in heat generation in the coil. In particular, it is possible to lift steel materials piece by piece even if they are thin steel materials with a plate thickness of 20 mm or less.

Figure 4:
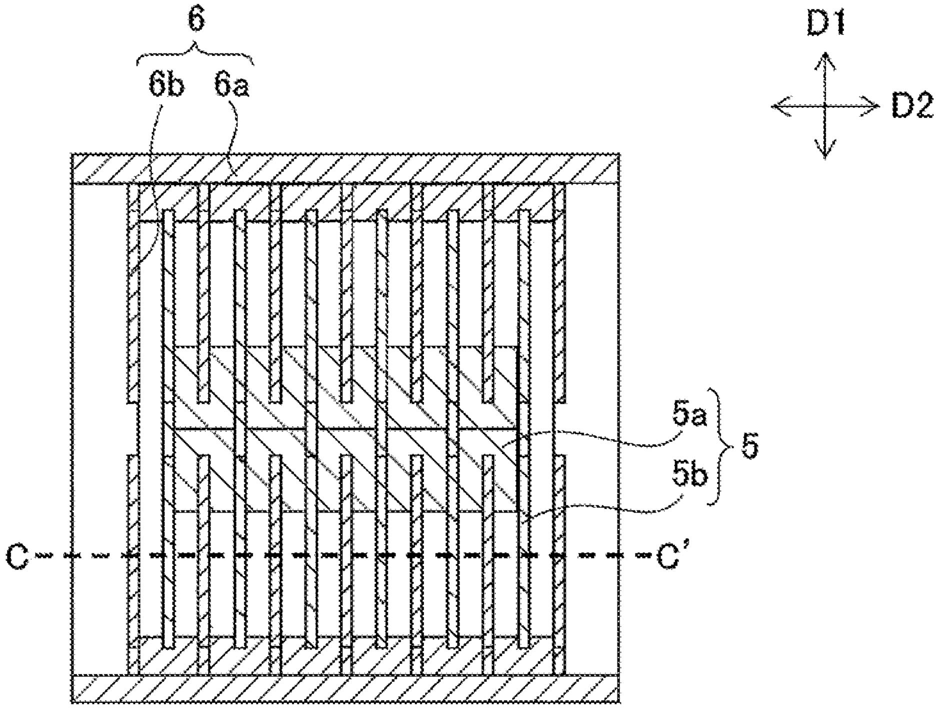
FIG. 4 schematically illustrates a configuration of an exemplary lifting-magnet attachment magnetic pole unit according to a first embodiment of the present invention.
Figure 4:
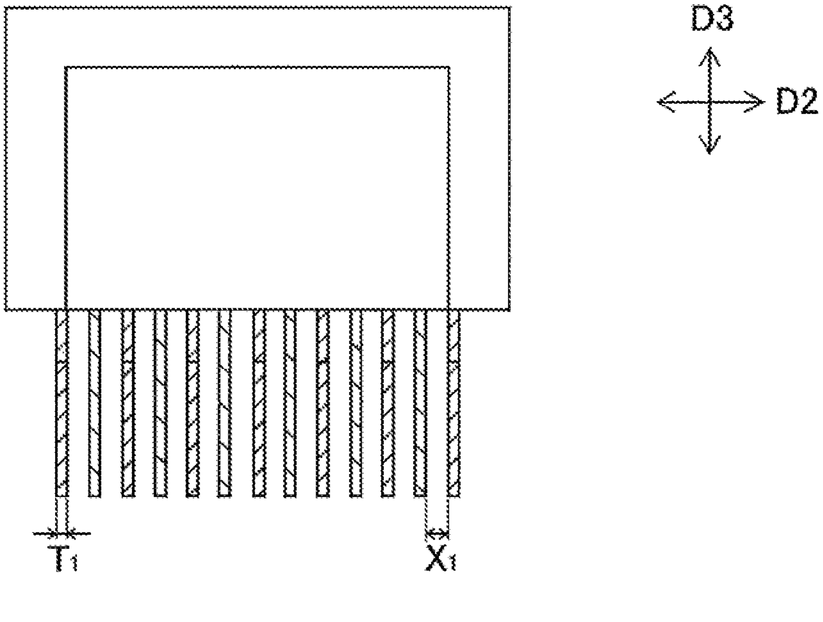
Figure 5:
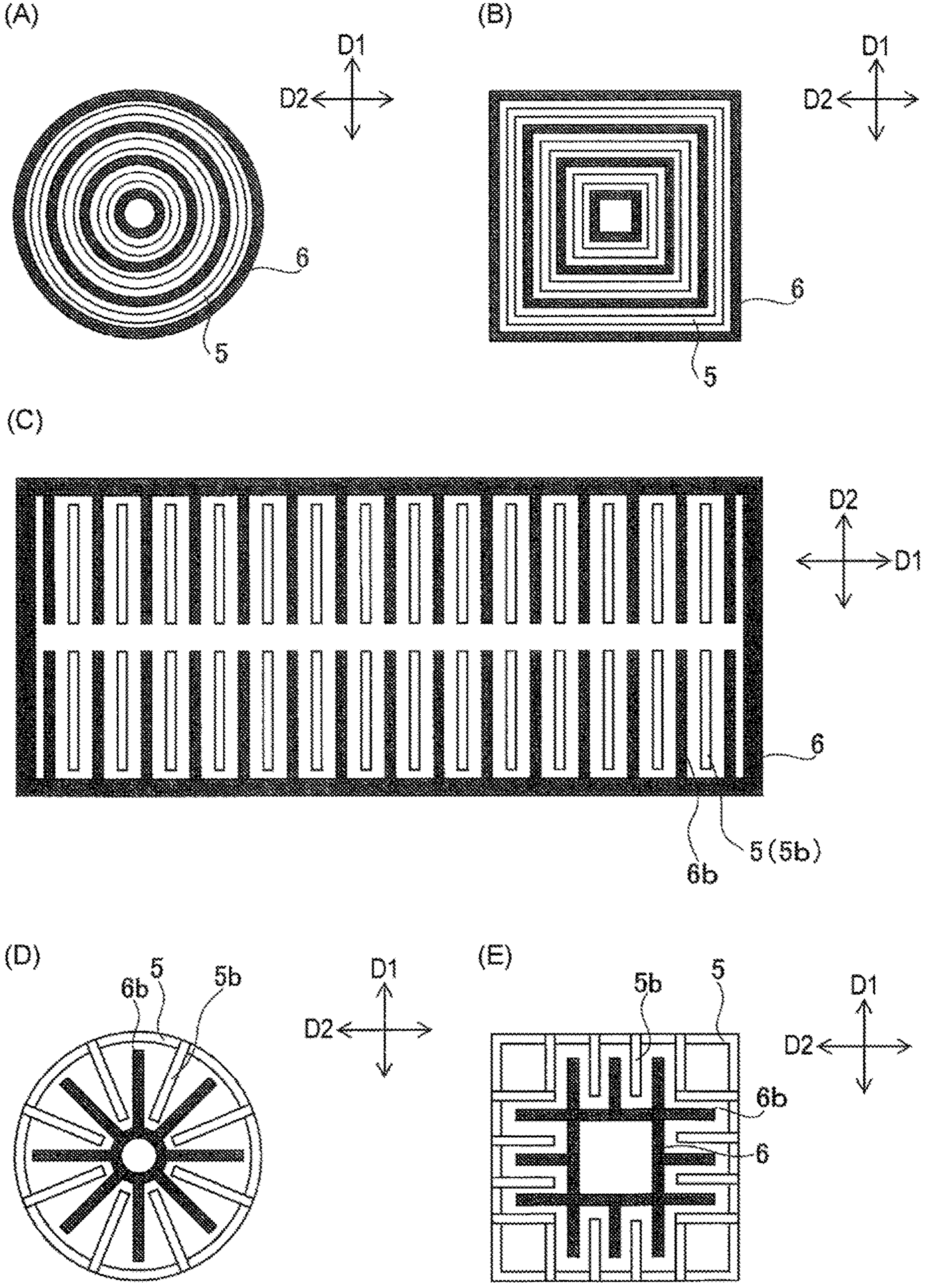
FIG. 5 schematically illustrates cross-sectional shapes of another exemplary lifting-magnet attachment magnetic pole unit according to the first embodiment of the present invention.

A lifting-magnet attachment magnetic pole unit according to the first embodiment of the present invention will now be described. FIG. 4 schematically illustrates an exemplary lifting-magnet attachment magnetic pole unit used in the first embodiment of the present invention. FIG. 5 schematically illustrates other cross-sectional shapes of the lifting-magnet attachment magnetic pole unit. FIG. 4(A) and FIGS. 5(A) to 5(E) each illustrate a lifting-magnet attachment magnetic pole unit, as viewed from the underside, and FIG. 4(B) is a cross-sectional view taken along line C-C' in FIG. 4(A). In the following description, the same parts in the drawings are identified by the same reference numerals. In the drawings, directions D1 and D2 indicated by two-way arrows are parallel to the steel material surface, whereas direction D3 is perpendicular to the steel material surface.

As illustrated in FIG. 4(A), a lifting-magnet attachment magnetic pole unit used in an apparatus for conveying steel materials includes at least a first split magnetic pole 5 and a second split magnetic pole 6. The first split magnetic pole 5 includes a first shaft 5*a* in contact with an iron core (inner pole) of a typical lifting magnet, and a plurality of first branches 5*b* configured to branch off the first shaft 5*a*. The second split magnetic pole 6 includes a second shaft 6*a* in contact with a yoke (outer pole) of the typical lifting magnet, and a plurality of second branches 6*b* configured to branch off the second shaft 6*a*. The first and second split magnetic poles 5 and 6 are configured to allow the first and second branches 5*b* and 6*b* to be alternately arranged. For example, in areas where the first and second split magnetic poles 5 and 6 are in contact with the steel material to be lifted, or in their vicinities, the first and second branches 5*b* and 6*b* are alternately arranged, with non-magnetic bodies or spaces each interposed between adjacent ones of the first and second branches 5*b* and 6*b*. FIGS. 4(A) and 4(B) illustrate a configuration where the first and second branches 5*b* and 6*b* are alternately arranged, with spaces each interposed between adjacent ones of the first and second branches 5*b* and 6*b*.

When the first and second branches 5*b* and 6*b* are alternately arranged, with spaces therebetween, as illustrated in FIG. 4(B), a distance $X_1$ between adjacent ones of the first and second branches 5*b* and 6*b* alternately arranged is preferably 30 mm or less. If this distance exceeds 30 mm, the resulting decrease in the number of first and second branches makes it difficult to fully achieve the magnetic flux diffusion effect. This may cause the occurrence of magnetic flux saturation in the uppermost piece of steel material. It is preferable that the distance $X_1$ be 20 mm or less. Although aspects of the present invention do not specify the lower limit of the distance $X_1$, the distance $X_1$ is set to 5 mm or more to prevent the magnetic field circuit from shorting. It is preferable that the distance $X_1$ be 10 mm or more. When the spaces described above are replaced by non-magnetic bodies, it is preferable to adjust the width of the non-magnetic bodies in the same manner as above.

A plate thickness $T_1$ of the first and second split magnetic poles 5 and 6 is preferably 20 mm or less. If the plate thickness $T_1$ exceeds 20 mm, a large amount of magnetic flux is applied from the magnetic pole of one branch (i.e., each of the first and second branches 5*b* and 6*b*) and the magnetic flux diffusion effect cannot be easily achieved. This may cause the occurrence of magnetic flux saturation in the uppermost piece of steel material. The plate thickness $T_1$ is preferably 15 mm or less. Although aspects of the present invention do not specify the lower limit of $T_1$, the plate thickness $T_1$ is set to 5 mm or more to ensure the strength of the magnetic poles of branches for lifting steel materials having a large plate thickness.

The dimensions of the first split magnetic pole 5 preferably satisfy Inequality (1) described below. As described with reference to FIGS. 1 and 2, when the cross-sectional area of the inner pole inside the coil of the lifting magnet is S ($mm^2$), the mean magnetic flux density in the inner pole inside the coil is B (T), the total perimeter of the inner pole in a region where the inner pole is in contact with a lifted steel material is L (mm), the plate thickness of the steel material is t (mm), and the saturation magnetic flux density in the steel material is $B_S$ (T), then the cross-sectional area of the neck portions 113 and 123 in the steel material is L×t. Therefore, the magnetic flux that can pass through the neck portion is expressed as (cross-sectional area of neck portion)×(saturation magnetic flux density in steel material), that is, $L \times t \times B_S$. The magnetic flux applied from the coil is expressed as (cross-sectional area of inner pole)×(mean magnetic flux density in inner pole), that is, S×B. Therefore, if a relation where the magnetic flux that can pass through the neck portion (i.e., $L \times t \times B_S$) is greater than the magnetic flux applied from the coil (i.e., S×B) is satisfied, that is, if the following Inequality (1) representing this relation is satisfied, then it is theoretically unlikely that magnetic flux saturation will occur in the uppermost piece of steel material.

It is thus preferable to make adjustment such that the dimensions of the first split magnetic pole 5 satisfy the following Inequality (1):

$$S \times B < L \times t \times B_S \qquad \text{Inequality (1)}$$

where

- S is the cross-sectional area ($mm^2$) of the inner pole of the lifting magnet;
- B is the mean magnetic flux density (T) inside the inner pole of the lifting magnet;
- L is the total perimeter (mm) of the first split magnetic pole in a region where the first split magnetic pole is in contact with a lifted steel material;
- t is the plate thickness (mm) of the lifted steel material; and
- $B_S$ is the saturation magnetic flux density (T) in the lifted steel material.

If the dimensions of the first split magnetic pole 5 do not satisfy Inequality (1), it is theoretically possible that magnetic flux saturation will occur in the uppermost piece of steel material. Even in this case, however, the level of magnetic flux saturation in the uppermost piece of steel material is lower than that in the conventional technique where the magnetic pole does not have a branched shape. The branched shape reduces the level of magnetic flux saturation and makes it difficult to attract steel materials at lower levels. That is, in accordance with aspects of the present invention, where the magnetic pole is split as described above, it is possible to reduce the level of magnetic flux saturation and make it difficult to attract steel materials at lower levels. Additionally, when the first split magnetic pole 5 satisfies Inequality (1), the magnetic flux saturation becomes zero and this can make the attracting force for attracting the steel materials at lower levels substantially zero. It is thus possible to perform control such that not all steel materials stacked at lower levels are attracted.

In the lifting-magnet attachment magnetic pole unit according to the first embodiment of the present invention, the first shaft 5*a* is connected to the iron core of a typical electromagnetic lifting magnet and the second shaft 6*a* is connected to the yoke of the lifting magnet to form the first and second split magnetic poles 5 and 6 having a branched structure on the typical lifting magnet. By bringing the lifting-magnet attachment magnetic pole unit into contact with a steel material, with a coil 4 being in an energized state, a magnetic field circuit is formed by a magnetic flux applied (input) from an iron core 2 (inner pole) to the first shaft 5*a*, the first branches 5*b*, the steel material, the second branches 6*b*, the second shaft 6*a*, and a yoke 3 (outer pole) in this order. The steel material to be lifted is thus attracted to the lifting magnet. It is thus possible to avoid an increase in the weight of the lifting magnet and an increase in heat generation in the coil, and to lift and move steel materials piece by piece without causing the problem of the magnetic flux saturation described above.

The first split magnetic pole 5 according to aspects of the present invention is configured to have dimensions that satisfy Inequality (1). Thus, when a steel material is to be lifted using a lifting magnet, a magnetic flux output from one coil can be effectively branched off by the first and second branches 5*b* and 6*b* and input to the steel material. This enables further accurate adjustment that can prevent the occurrence of magnetic flux saturation in the steel material. Therefore, in particular, even in the case of relatively thin steel materials with a plate thickness of 20 mm or less, only one piece of steel material at the top of those stacked in layers can be easily lifted. In particular, even in the case of steel materials with a plate thickness exceeding 20 mm, it is still possible to similarly lift them piece by piece. In accordance with aspects the present invention, it is possible naturally to simultaneously lift a plurality of steel materials by adjusting the split magnetic poles.

The lifting-magnet attachment magnetic pole unit according to the first embodiment of the present invention may be of an attachment type that can be attached later to the inner pole and the outer pole of the typical lifting magnet described above. Alternatively, like a magnetic-pole-equipped lifting magnet according to aspects of the present invention described below, the magnetic poles (inner and outer poles) of the lifting magnet itself may be divided into branched magnetic poles (first and second branches 5*b* and 6*b*). In either case, the same effects according to aspects the present invention can be achieved.

With reference to FIG. 5, another exemplary lifting-magnet attachment magnetic pole unit according to the first embodiment of the present invention will be described. The first and second split magnetic poles 5 and 6 according to aspects of the present invention may be of any shape that allows the magnetic flux output from the inner pole toward the outer pole of the lifting magnet to be divided. For example, the first and second split magnetic poles 5 and 6 may be in the shape of overlapping circles of different sizes as illustrated in FIG. 5(A), in the shape of overlapping squares of different sizes as illustrated in FIG. 5(B), in the shape of a rectangle in which the first and second branches 5*b* and 6*b* are alternately arranged in two rows as illustrated in FIG. 5(C), in the shape of a circle in which the first and second branches 5*b* and 6*b* are alternately arranged in the circumferential direction as illustrated in FIG. 5(D), or in the shape of a quadrangle in which the first and second branches 5*b* and 6*b* are alternately arranged in the circumferential direction as illustrated in FIG. 5(E).

Figure 6:
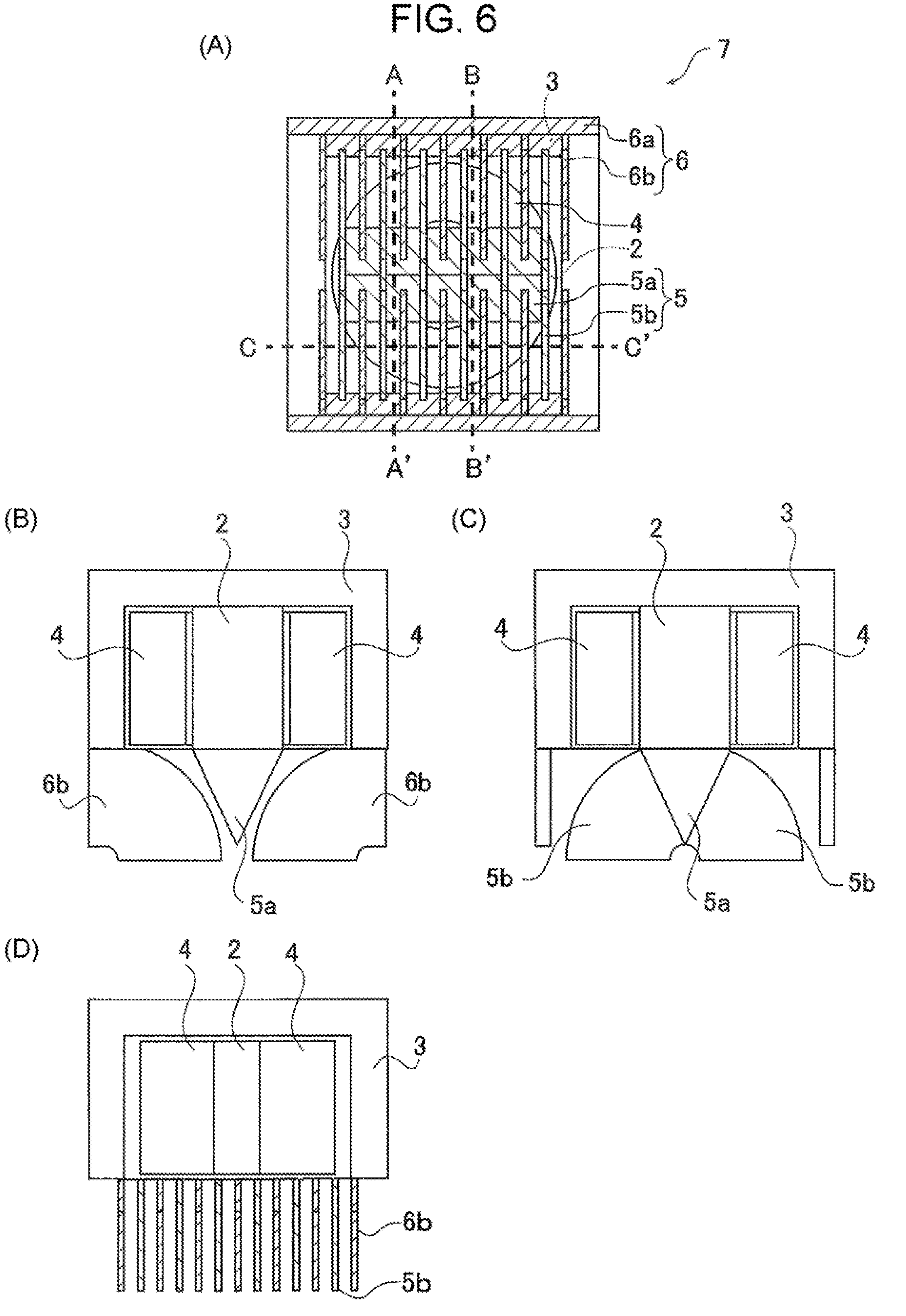
FIG. 6 schematically illustrates a configuration of an exemplary magnetic-pole-equipped lifting magnet according to the first embodiment of the present invention.

A magnetic-pole-equipped lifting magnet according to the first embodiment of the present invention will now be described. FIG. 6 schematically illustrates a magnetic-pole-equipped lifting magnet which is an embodiment of the present invention. Specifically, FIG. 6(A) illustrates the magnetic-pole-equipped lifting magnet as viewed from the underside, FIG. 6(B) is a cross-sectional view taken along line A-A' in FIG. 6(A), FIG. 6(C) is a cross-sectional view taken along line B-B' in FIG. 6(A), and FIG. 6(D) is a cross-sectional view taken along line C-C' in FIG. 6(A).

As illustrated in FIG. 6(A), a magnetic-pole-equipped lifting magnet 7 used in an apparatus for conveying steel materials includes the iron core 2 and the yoke 3 disposed opposite each other, with the coil 4 interposed therebetween, the first split magnetic pole 5, and the second split magnetic pole 6. The first split magnetic pole 5 and the second split magnetic pole 6 both have a branched structure. The configuration of the first and second split magnetic poles 5 and 6 will not be described, as it is the same as that mentioned in the foregoing description of the lifting-magnet attachment magnetic pole unit. Here, the "lifting magnet" in Inequality (1) refers to "magnetic-pole-equipped lifting magnet" according to aspects of the present invention.

By bringing the magnetic-pole-equipped lifting magnet 7 according to aspects of the present invention into contact with a steel material, with the coil 4 being in an energized state, a magnetic field circuit is formed by a magnetic flux applied (input) from the iron core 2 (inner pole) to the first shaft 5*a*, the first branches 5*b*, the steel material, the second branches 6*b*, the second shaft 6*a*, and the yoke 3 (outer pole) in this order. The steel material is thus attracted to the magnetic-pole-equipped lifting magnet. The magnetic-pole-equipped lifting magnet according to aspects of the present invention can achieve the same effects as the lifting-magnet attachment magnetic pole unit described above.

Second Embodiment

A lifting-magnet attachment magnetic pole unit and a steel-lifting magnetic-pole-equipped lifting magnet according to a second embodiment are configured basically the same as those of the first embodiment, but differ therefrom in that the first split magnetic pole includes at least one movable magnetic pole and a fixed magnetic pole in a region adjacent to the movable magnetic pole. The fixed magnetic pole is disposed on a surface in contact with the steel material. The movable magnetic pole is of a movable type. The fixed magnetic pole has dimensions satisfying Inequality (2) described below.

The second embodiment of the present invention can control the number of steel materials to be lifted by one magnetic-pole-equipped lifting magnet, as described above, such that, for example, only one piece of steel material is lifted or only a desired number of (e.g., two or three) pieces of steel material are lifted. The present inventors completed aspects of the present invention by finding that controlling the penetration depth of magnetic flux in steel materials was effective in controlling the number of steel materials to be lifted. Since techniques other than those related to controlling the number of steel materials to be lifted, are basically the same as those of the first embodiment, redundant description will be omitted.

First, a technical idea of the second embodiment of the present invention will be described.

Figure 11:
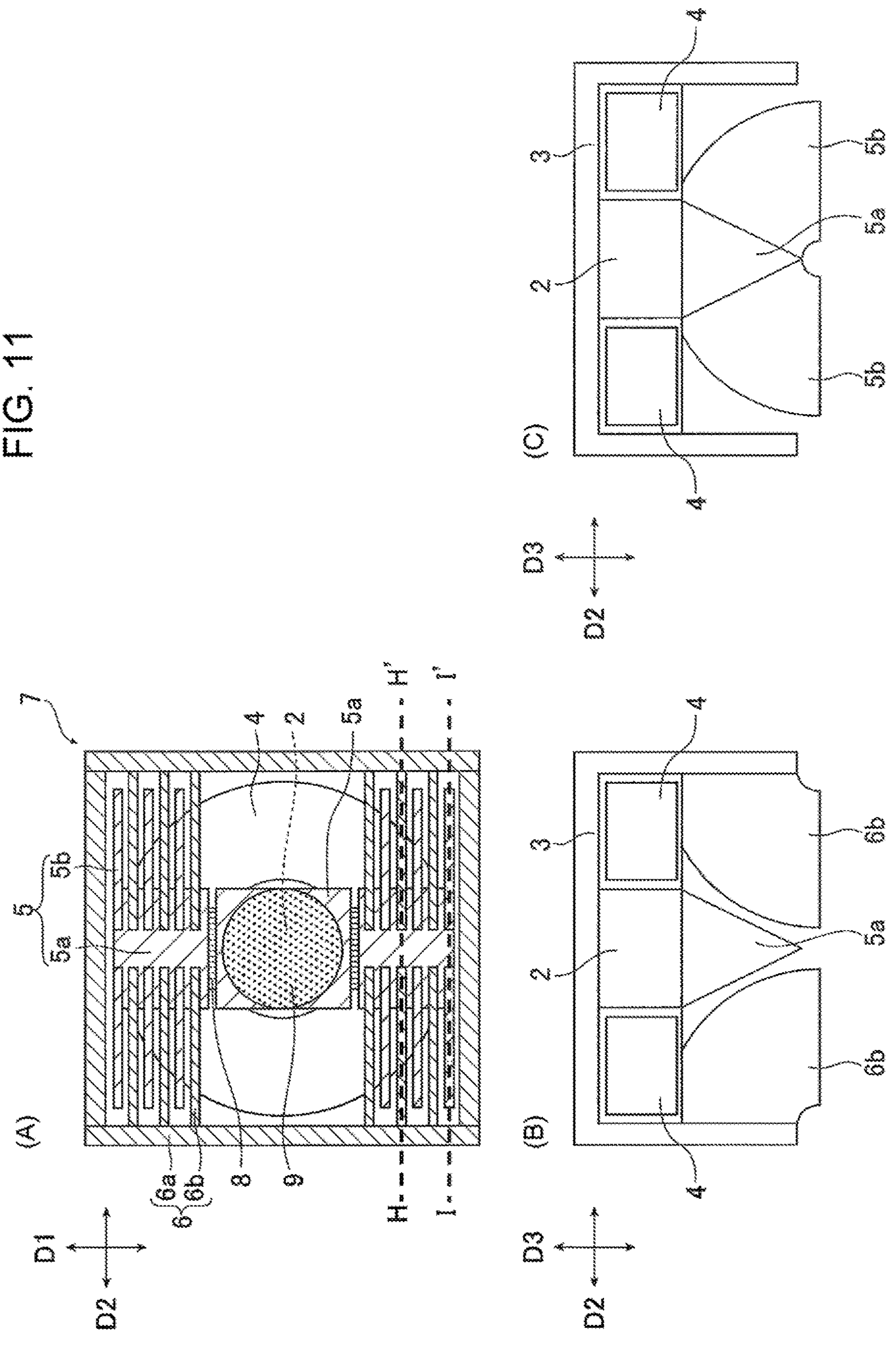
FIG. 11(A) to FIG. 11(C) schematically illustrate a configuration of an exemplary magnetic-pole-equipped lifting magnet according to the second embodiment of the present invention.
Figure 12:
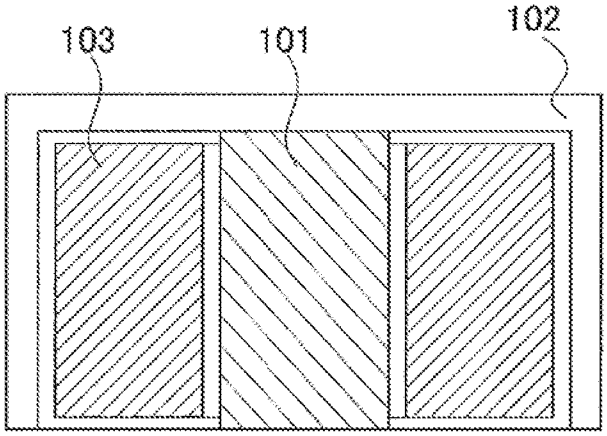
FIG. 12 is a cross-sectional view illustrating a structure of a conventional, typical lifting magnet.

To control the penetration depth of magnetic flux in steel materials to be lifted, aspects of the present invention provides a lifting magnet that includes, as in FIG. 11 described below, split magnetic poles structured to divide the magnetic flux output from one coil, and a fixed magnetic pole configured to allow the magnetic flux output from the coil to penetrate to a desired depth.

As illustrated in FIG. 1(B), the magnetic flux 134 applied from the inner pole 111 into the steel materials is diffused from the bottom of the inner pole 111 toward the bottom of the outer pole 112. In this case, a region directly below the outer periphery of the inner pole 111 is a portion (neck portion) where the magnetic flux density is highest in the steel materials. The cross-sectional area of this portion determines the penetration depth of the magnetic flux 134. For example, in the example illustrated in FIG. 1(B), the penetration depth of the magnetic flux is from the steel material 133*a* at the top to the steel material 133*c* at the third level from the top.

The amount of magnetic flux that can pass through the steel material is expressed as $L \times t \times B_S$, where L (mm) is the total perimeter of a portion where the inner pole 111 is in contact with the lifted steel material 133, t (mm) is the plate thickness of the steel material, and $B_S$ (T) is the saturation magnetic flux density in the steel material. Therefore, if the magnetic flux M (mm·T) applied from the coil satisfies the following relational equation A (Equation A), the magnetic flux necessary and sufficient to simultaneously lift the top to n-th layers of the steel material 133 is theoretically likely to pass through the steel materials:

[Equation 1]

$$M = L \times \sum_{k=1}^{n} (t_k \times B_s) \quad \text{Equation A}$$

Where $t_k$ (mm) is the plate thickness of the k-th steel material from the top.

The amount of magnetic flux M is expressed as $M = S \times B$, where S ($mm^2$) is the cross-sectional area of the inner pole inside the coil, and B (T) is the mean magnetic flux density in the inner pole inside the coil. The relational equation A can thus be expressed by the following relational equation A' (Equation A'):

[Equation 2]

$$S \times B = L \times \sum_{k=1}^{n} (t_k \times B_s) \quad \text{Equation A'}$$

The technique described in Patent Literature 4 is a method that controls the mean magnetic flux density (B) in the inner pole by controlling the current value of the coil to satisfy the relational equation A. The technique described in Patent Literature 3 is a method that controls the total perimeter (L) of the portion where the inner pole is in contact with the steel material to satisfy the relational equation A.

A large magnetic-pole lifting magnet, such as that typically used in the plate mill of the steel works, has a large maximum magnetic flux penetration depth, as described above. As in Patent Literature 4, when the mean magnetic flux density (B) in the inner pole is controlled by controlling the current value of the coil to adjust the number of steel materials to be lifted, the penetration depth of magnetic flux changes significantly in response to a small change in current. Therefore, if steel materials are of a small (thin) plate thickness, it is difficult to control the number of steel materials to be lifted with high accuracy, because of gaps created by warpage or errors of the magnetic flux sensor.

As in Patent Literature 3, when the amount of magnetic flux is controlled by controlling the total perimeter (L) of the portion where the inner pole is in contact with the steel material, the size of the coil may be simply reduced to use a plurality of coils reduced in size. However, using this method to control, for example, thin steel materials with a plate thickness of about 5 mm is not practical, because of the resulting increase in the weight of the lifting magnet and in the amount of heat generation in the coil.

To solve the problems described above, the present inventors examined techniques for adjusting the penetration depth of magnetic flux and obtained the following knowledge.

On the left side of the relational equation A', the cross-sectional area (S) of the inner pole is proportional to the square of the magnetic pole size, and on the right side of the relational equation A', the total perimeter (L) of the portion where the inner pole is in contact with the steel material is proportional to the magnetic pole size. The present inventors thus found out that as the magnetic pole size increases, the value of "n" satisfying the relational equation A' also increases and the penetration depth of magnetic flux increases. That is, the present inventors discovered that a magnetic flux is to be produced by one large coil and to be input to steel materials (steel plates) by a plurality of magnetic poles. Examples of the plurality of magnetic poles include, as in FIGS. 9 and 10 described below, the branched magnetic poles 5*b* and 6*b* (i.e., split magnetic poles into which the inner and outer poles are partially branched) and the magnetic pole 9 formed into a predetermined size (i.e., fixed magnetic pole in contact with the inner pole and disposed in a region in contact with the steel material). Then, a magnetic flux is input to the steel material using at least one of the magnetic poles described above. The present inventors thus found out that, with this technique, it is possible to control the total perimeter (L) of the portion where the inner pole is in contact with the steel material and to adjust the penetration depth of magnetic flux. The present inventors also found out that the mean magnetic flux density (B) in the inner pole can be controlled, where necessary, by current control.

In accordance with aspects of the present invention, it is possible to adjust the maximum penetration depth of magnetic flux to an appropriate level in accordance with the plate thickness of steel materials to be lifted while avoiding an increase in the weight of the lifting magnet and an increase in heat generation in the coil. Also, since the maximum penetration depth of magnetic flux is controlled by magnetic poles, if this control is combined with controlling the penetration depth of magnetic flux using current, the penetration depth of magnetic flux can be controlled with higher accuracy than when only current is used to carry out the control. For example, in the plate mill of the steel works, steel materials with a plate thickness of several mm to several tens of mm are mainly lifted. By varying the design values of magnetic pole sizes, it is theoretically possible to control the number of steel materials to be lifted even if the steel materials are of a smaller plate thickness on the order of 0.1 mm.

One lifting-magnet attachment magnetic pole unit may have a plurality of magnetic poles (split or fixed magnetic poles) that differ in the total perimeter (L) of the portion where the inner pole is in contact with the steel material. Then, by appropriately switching between magnetic field circuits of these magnetic poles, the maximum penetration depth of magnetic flux can be adjusted. Thus, by using one lifting-magnet attachment magnetic pole unit, the number of steel materials of various plate thicknesses to be lifted can be controlled with high accuracy.

Figure 9:
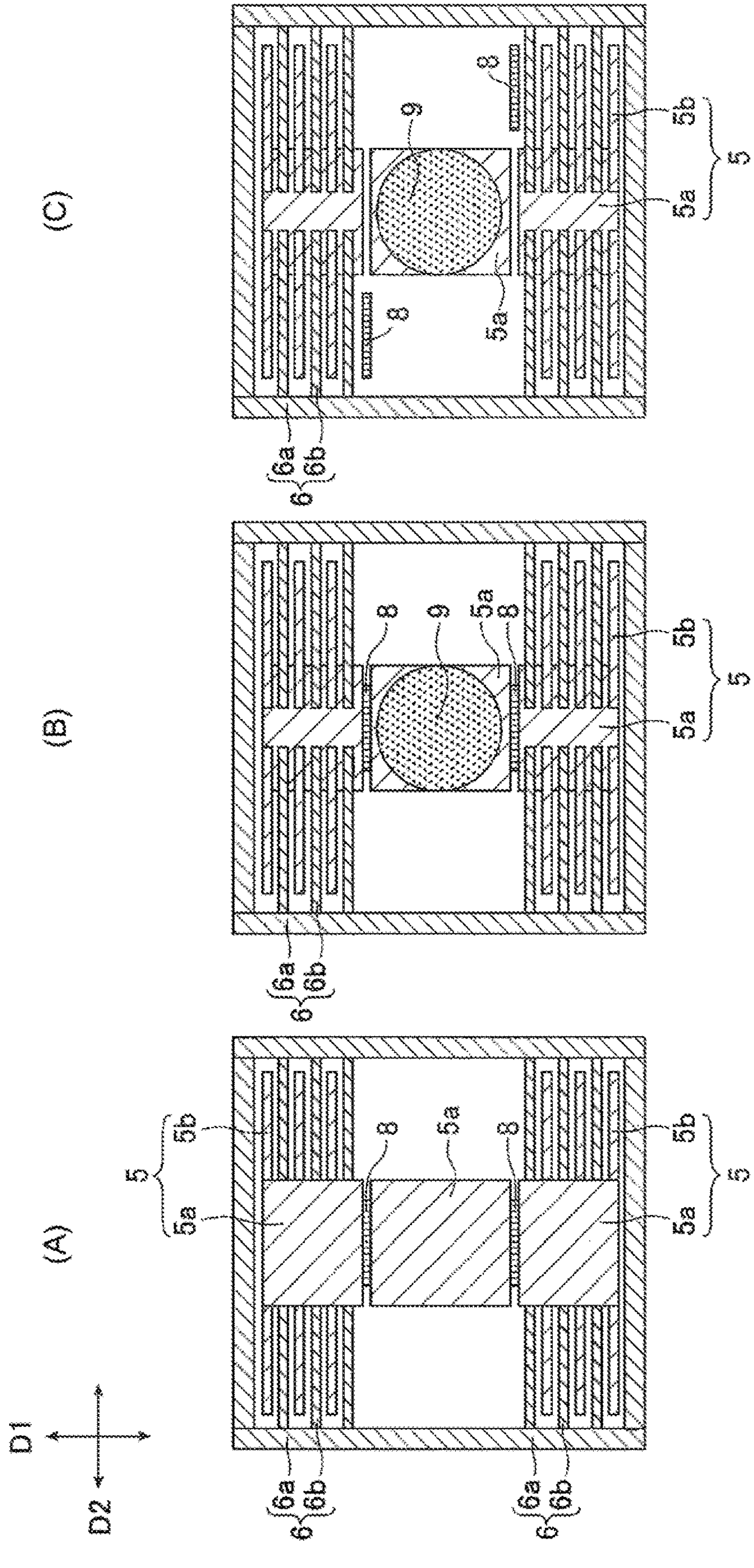
FIG. 9(A) to FIG. 9(C) schematically illustrate a configuration of an exemplary lifting-magnet attachment magnetic pole unit according to a second embodiment of the present invention.
Figure 10:
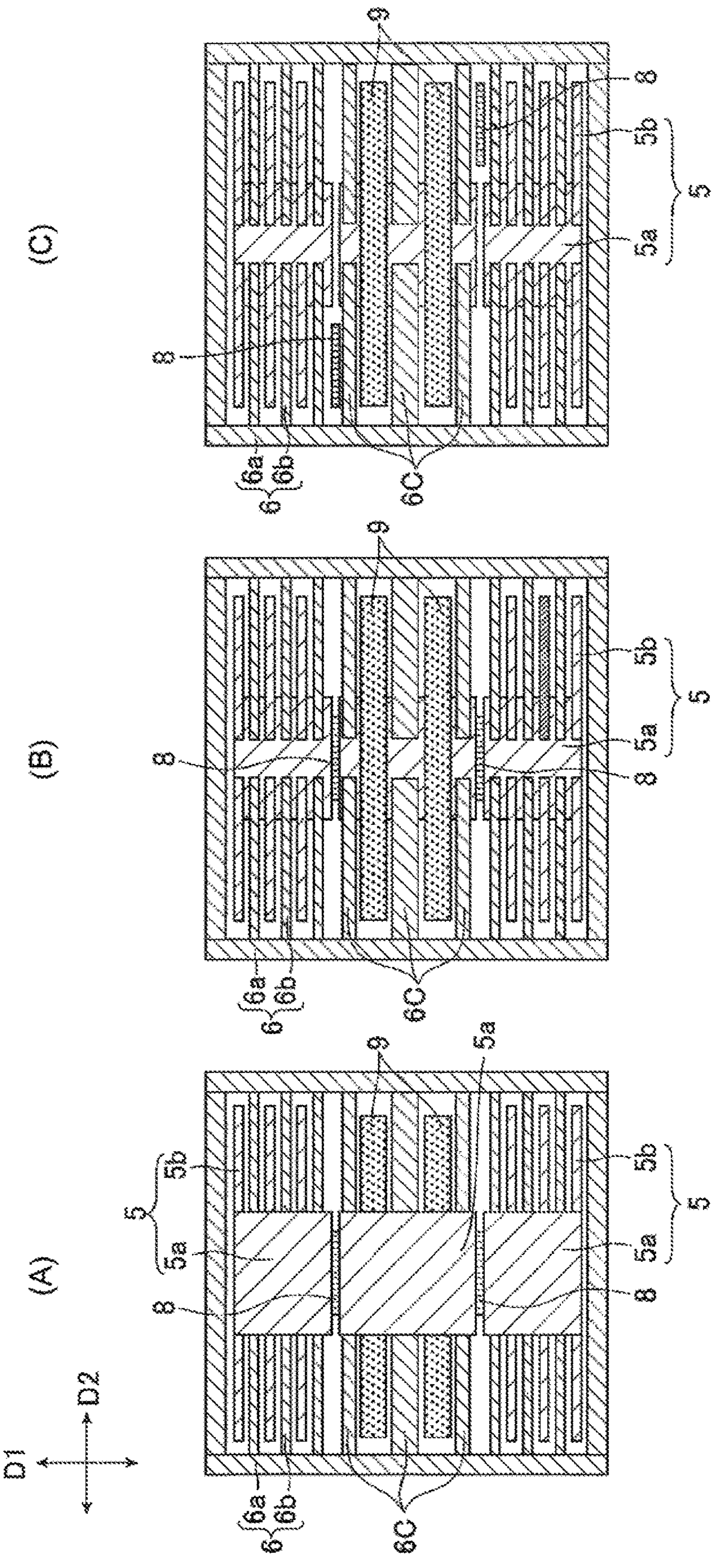
FIG. 10(A) to FIG. 10(C) schematically illustrate a configuration of another exemplary lifting-magnet attachment magnetic pole unit according to the second embodiment of the present invention.

A lifting-magnet attachment magnetic pole unit according to the second embodiment of the present invention will now be described. FIG. 9 schematically illustrates an exemplary lifting-magnet attachment magnetic pole unit used in the second embodiment of the present invention. FIG. 10 schematically illustrates another exemplary lifting-magnet attachment magnetic pole unit used in the second embodiment of the present invention. FIG. 9(A) and FIG. 10(A) are plan views each illustrating the lifting-magnet attachment magnetic pole unit as viewed from the lifting magnet, and FIGS. 9(B) and 9(C) and FIGS. 10(B) and 10(C) are plan views each illustrating the lifting-magnet attachment magnetic pole unit as viewed from the steel material. In the following description, the same parts in the drawings are identified by the same reference numerals. In the drawings, directions D1 and D2 indicated by two-way arrows are parallel to the steel material surface.

In the example illustrated in FIGS. 9(A) to 9(C), the lifting-magnet attachment magnetic pole unit used in an apparatus for conveying steel materials includes at least the first split magnetic pole 5 and the second split magnetic pole 6, as in the first embodiment. The first split magnetic pole 5 includes the first shaft 5*a* in contact with an iron core (inner pole) of a lifting magnet, and the plurality of first branches 5*b* branching off the first shaft 5*a*. The second split magnetic pole 6 includes the second shaft 6*a* in contact with a yoke (outer pole) of the lifting magnet, and the plurality of second branches 6*b* branching off the second shaft 6*a*. The first and second branches 5*b* and 6*b* are alternately arranged, for example, with spaces or non-magnetic bodies each interposed between adjacent ones of the first and second branches 5*b* and 6*b*.

In the second embodiment, the first shaft 5*a* includes at least one movable magnetic pole 8 and a fixed magnetic pole 9. The first shaft 5*a* is divided by the movable magnetic pole 8 into a plurality of regions. The fixed magnetic pole 9 is in a region of the first shaft 5*a* adjacent to the movable magnetic pole 8, and is disposed on a surface in contact with the steel material. The movable magnetic pole 8 is of a movable type. In the example illustrated in FIG. 9(C), the movable magnetic pole 8 is capable of moving in a direction parallel to the first branches 5*b* (or second branches 6*b*). The movable magnetic pole 8 is moved, for example, using a linear slider. The shape (e.g., circular or rectangular shape) of the fixed magnetic pole 9 may be appropriately determined in accordance with the number of steel materials to be lifted.

FIGS. 9(A) to 9(C) illustrate an example where the first shaft 5*a* is divided by two movable magnetic poles 8 into three regions. Of the three regions, two outer regions each have the first and second branches 5*b* and 6*b* alternately arranged at predetermined intervals. In the center region (interposed between the two movable magnetic poles 8), the fixed magnetic pole 9 circular in shape is disposed on the surface in contact with the steel material. In the example illustrated in FIG. 9, one lifting-magnet attachment magnetic pole unit has therein two magnetic poles (i.e., two magnetic field circuits), the split and fixed magnetic poles. Lifting one piece of steel material involves using the first branch 5*b*, the second branch 6*b*, and the fixed magnetic pole 9 as illustrated in FIG. 9(B), whereas lifting two or more steel materials involves using only the fixed magnetic pole 9 as illustrated in FIG. 9(C).

FIG. 9 illustrates an example where adjacent ones of the first and second branches 5*b* and 6*b* are provided with a space therebetween. In this case, for the same reason as that in the first embodiment, it is preferable that the distance $X_1$ between adjacent ones of the first and second branches 5*b* and 6*b* be 30 mm or less. It is more preferable that the distance $X_1$ be 20 mm or less. Although the lower limit of the distance $X_1$ is not specified, it is preferable that the distance $X_1$ be 5 mm or more for preventing the magnetic field circuit from shorting. It is more preferable that the distance $X_1$ be 10 mm or more. When the spaces described above are replaced by non-magnetic bodies, it is preferable to adjust the width of the non-magnetic bodies.

As in the embodiment described above, it is preferable that the plate thickness $T_1$ of the first and second split magnetic poles 5 and 6 be 20 mm or less. It is more preferable that the plate thickness $T_1$ be 15 mm or less. Although aspects of the present invention do not specify the lower limit of the plate thickness $T_1$, it is preferable that the plate thickness $T_1$ be 5 mm or more, as in the embodiment described above.

The plate thickness $T_2$ of the fixed magnetic pole 9 may be appropriately set in accordance with the maximum total plate thickness $T_1$ of steel materials to be lifted. For the maximum total plate thickness $t_1$ of steel materials to be lifted, the plate thickness $T_2$ of the fixed magnetic pole 9 and the number of branches are set to determine $L_1$ such that Inequality (2) is satisfied.

Next, with reference to FIG. 10, another exemplary lifting-magnet attachment magnetic pole unit according to the second embodiment of the present invention will be described. This exemplary lifting-magnet attachment magnetic pole unit has the same structure as that illustrated in FIG. 9, except that the fixed magnetic pole 9 is quadrangular in shape. Redundant description will therefore be omitted.

As illustrated in FIGS. 10(A) to 10(C), the fixed magnetic pole 9 is configured to be split. For example, two rectangular fixed magnetic poles 9 are arranged to extend parallel to the first branches 5*b*. In this example, the two fixed magnetic poles 9 are provided with second branches 6*c* adjacent thereto. The second branches 6*c* may be replaced by spaces or non-magnetic bodies.

The fixed magnetic pole is configured to be split for the purpose of controlling the penetration depth of magnetic flux in accordance with the maximum total plate thickness of steel materials to be lifted. To reduce the penetration depth of the magnetic flux of the fixed magnetic pole, the fixed magnetic pole 9 may be split into two to increase, in limited space, the perimeter of the portion where the intended inner pole is in contact with the steel material. If the perimeter of the portion where the intended inner pole is in contact with the steel material can be secured with one fixed magnetic pole 9 alone, the fixed magnetic pole 9 may be kept undivided.

The movable magnetic poles 8 and the fixed magnetic pole 9, which have important roles in the second embodiment of the present invention, will now be described in detail.

As described above, in the second embodiment, the penetration depth of magnetic flux is controlled by switching the path of magnetic flux produced in the coil either to the split and fixed magnetic poles which do not allow the magnetic flux to penetrate deep in the steel material in the plate thickness direction, or to the fixed magnetic pole alone which allows the magnetic flux to penetrate deep in the steel material in the plate thickness direction. This makes it possible to control the number of steel materials to be lifted. The switching is made by changing the position of the movable magnetic poles 8.

FIG. 9(B) and FIG. 10(B) each illustrate the movable magnetic poles 8 that are in contact with the first shaft 5*a*, that is, the movable magnetic poles 8 that are each located between adjacent regions of the first shaft 5*a* divided as described above. In this case, by bringing the lifting-magnet attachment magnetic pole unit into contact with the steel material, with the coil 4 being in an energized state, a magnetic field circuit is formed by a magnetic flux applied (input) from the iron core (inner pole) 2 to the fixed magnetic pole 9, the first shaft 5*a*, the first branches 5*b*, the steel material, the second branches 6*b*, the second shaft 6*a*, and the yoke 3 (outer pole) in this order. As in the first embodiment, this allows only one piece of steel material to be lifted using the first split magnetic pole 5, the second split magnetic pole 6, and the fixed magnetic pole 9.

Although a magnetic flux is applied to the fixed magnetic pole 9 as described above, since the perimeter (L) of the portion where the first and second split magnetic poles 5 and 6 are in contact with the steel material is longer, substantially the entire magnetic flux is input from the split magnetic pole side to the steel material and this makes the penetration depth of magnetic flux shallow. The magnetic flux thus reaches only the first piece of steel materials stacked in layers.

In contrast, FIG. 9(C) and FIG. 10(C) each illustrate the movable magnetic poles 8 that are away from the first shaft 5*a*, that is, the movable magnetic poles 8 that are located outside the gaps between adjacent regions of the first shaft 5*a* divided as described above. In this case, the magnetic flux output from the coil is applied only to the fixed magnetic pole 9. This makes the penetration depth of the magnetic flux greater, and allows the magnetic flux to reach the second and subsequent pieces of the steel materials stacked in layers. Thus, with the fixed magnetic pole 9, several pieces of steel materials at the top can be lifted. The number of steel materials to be lifted can be controlled by appropriately adjusting the size of the fixed magnetic pole 9 to control the penetration depth for the fixed magnetic pole 9.

Preferable size (dimensions) of the fixed magnetic pole 9 according to aspects of the present invention will now be described.

In the second embodiment of the present invention, the dimensions of the fixed magnetic pole 9 preferably satisfy Inequality (2) described below. As described with reference to FIGS. 1 and 2, when the cross-sectional area of the inner pole inside the coil of the lifting magnet is S ($mm^2$), the mean magnetic flux density in the inner pole inside the coil is B (T), the total perimeter of the fixed magnetic pole in a region where the fixed magnetic pole is in contact with a lifted steel material is $L_1$ (mm), the maximum sum of the plate thicknesses of steel materials lifted by the fixed magnetic pole is $t_1$ (mm), and the saturation magnetic flux density in the steel material is $B_S$ (T). The magnetic flux that can pass through the neck portions 113 and 123 in the steel material is expressed as (cross-sectional area of neck portion)×(saturation magnetic flux density in steel material), that is, $L_1 \times t_1 \times B_S$. The magnetic flux applied from the coil is expressed as (cross-sectional area of inner pole)×(mean magnetic flux density in inner pole), that is, S×B. Therefore, if a relation where the magnetic flux that can pass through the neck portion (i.e., $L_1 \times t_1 \times B_S$) is greater than the magnetic flux applied from the coil (i.e., S×B) is satisfied, that is, if the following Inequality (2) representing this relation is satisfied, then it is theoretically unlikely that magnetic flux saturation will occur in the uppermost piece of steel material. By changing the value of $L_1$, the penetration depth of magnetic flux can be set to a value appropriate for the maximum total plate thickness ($t_1$) of steel materials to be lifted.

It is thus preferable to make adjustment such that the dimensions of the fixed magnetic pole 9 satisfy the following Inequality (2):

$$S \times B < L_1 \times t_1 \times B_S \qquad \text{Inequality (2)}$$

Where

S is the cross-sectional area ($mm^2$) of the inner pole of the lifting magnet;

B is the mean magnetic flux density (T) inside the inner pole of the lifting magnet;

$L_1$ is the total perimeter (mm) of the fixed magnetic pole in a region where the fixed magnetic pole is in contact with a lifted steel material;

$L_1$ is the maximum sum of the plate thicknesses (mm) of steel materials lifted by the fixed magnetic pole; and $B_S$ is the saturation magnetic flux density (T) in the lifted steel materials.

If the dimensions of the fixed magnetic pole 9 satisfy Inequality (2), the penetration depth of magnetic flux can be controlled with higher accuracy. The number of plates to be lifted can thus be accurately controlled. Therefore, in particular, even in the case of relatively thin steel materials with a plate thickness of 20 mm or less, it is possible to accurately lift only an intended number of steel materials stacked in layers. In particular, even in the case of steel materials with a plate thickness exceeding 20 mm, it is still possible to achieve the same effects as above.

In the lifting-magnet attachment magnetic pole unit according to the second embodiment of the present invention described above, the first shaft 5*a* is connected to the iron core (inner pole) of a typical electromagnetic lifting magnet and the second shaft 6*a* is connected to the yoke (outer pole) of the lifting magnet to form the first and second split magnetic poles 5 and 6 having a branched structure and the fixed magnetic pole 9 on the typical lifting magnet.

The lifting-magnet attachment magnetic pole unit according to the second embodiment of the present invention may be of an attachment type that can be attached later to the inner pole and the outer pole of the typical lifting magnet described above. Alternatively, like a magnetic-pole-equipped lifting magnet according to aspects of the present invention described below, the magnetic poles (inner and outer poles) of the lifting magnet themselves may be divided into branched magnetic poles (first and second branches 5*b* and 6*b*), and the first shaft 5*a* may be divided by movable magnetic poles to provide a fixed magnetic pole in a predetermined region. In either case, the same effects according to aspects the present invention can be achieved.

A magnetic-pole-equipped lifting magnet according to the second embodiment of the present invention will now be described. FIG. 11 schematically illustrates an exemplary magnetic-pole-equipped lifting magnet according to the second embodiment of the present invention. FIG. 11(A) is a plan view of the magnetic-pole-equipped lifting magnet as viewed from the underside, FIG. 11(B) is a cross-sectional view taken along line H-H' in FIG. 11(A), and FIG. 11(C) is a cross-sectional view taken along line I-I' in FIG. 11(A).

As illustrated in FIG. 11(A), the magnetic-pole-equipped lifting magnet 7 used in an apparatus for conveying steel materials includes the iron core 2 (inner pole) and the yoke 3 (outer pole) disposed opposite each other, with the coil 4 interposed therebetween, the first split magnetic pole 5, and the second split magnetic pole 6. The first split magnetic pole 5 and the second split magnetic pole 6 both have a branched structure. The first shaft 5*a* of the first split magnetic pole 5 is divided by at least one movable magnetic pole 8, and the first split magnetic pole 5 has the fixed magnetic pole 9 in a region interposed between movable magnetic poles 8. FIG. 11(A) illustrates an example where the first shaft 5*a* is divided by two movable magnetic poles 8 into three sections. The configuration of the first and second split magnetic poles 5 and 6, the movable magnetic poles 8, and the fixed magnetic pole 9 will not be described, as it is the same as that mentioned in the foregoing description of the lifting-magnet attachment magnetic pole unit. Here, the "lifting magnet" in Inequality (2) refers to "magnetic-pole-equipped lifting magnet" according to aspects of the present invention.

By bringing the magnetic-pole-equipped lifting magnet 7 according to aspects of the present invention into contact with a steel material, with the coil 4 being in an energized state, a magnetic field circuit is formed by a magnetic flux applied (input) from the iron core 2 (inner pole) to the fixed magnetic pole 9, the first shaft 5*a*, the first branches 5*b*, the steel material, the second branches 6*b*, the second shaft 6*a*, and the yoke 3 (outer pole) in this order. When, for example as illustrated in FIG. 11(A), the movable magnetic poles 8 are located in contact with the first shaft 5*a*, a magnetic flux is output and branched from the inner pole toward the outer pole, through the first branches 5*b*, the second branches 6*b*, and the fixed magnetic pole 9. Thus, only the uppermost piece of steel materials stacked in layers is attracted to the first branches 5*b*, the second branches 6*b*, and the fixed magnetic pole 9 of the magnetic-pole-equipped lifting magnet. On the other hand, when, for example as illustrated in FIG. 9(C), the movable magnetic poles 8 are located not in contact with the first shaft 5*a*, a magnetic flux output from the inner pole to the fixed magnetic pole 9 is directly applied to the steel materials. Therefore, of steel materials stacked in layers, the first to n-th piece (i.e., two or more) of steel materials at the top are attracted to the fixed magnetic pole 9 of the magnetic-pole-equipped lifting magnet.

In accordance with aspects of the present invention, by moving the movable magnetic poles 8 as described above, a magnetic field circuit can be controlled to be formed either on the side of the first branches 5*b* and the second branches 6*b* and in the fixed magnetic pole 9, or only in the fixed magnetic pole 9. With the magnetic-pole-equipped lifting magnet according to aspects of the present invention, the same effects as the lifting-magnet attachment magnetic pole unit described above can be achieved.

As described above, for lifting steel materials using an electromagnetic lifting magnet, a magnetic flux output from one coil is applied to the steel materials through the split magnetic poles or the fixed magnetic pole, so that the maximum penetration depth of magnetic flux in the steel materials can be controlled. That is, in accordance with aspects of the present invention, by changing the magnetic field circuit as described above, the maximum penetration depth of magnetic flux can be changed to a desired value. Thus, even when objects to be lifted are steel materials of a thin plate thickness (i.e., thin steel materials), the number of pieces of steel materials to be lifted can be easily controlled with high accuracy.

In accordance with aspects of the present invention, where magnetic poles are used to carry out control without changing the size of the lifting magnet coil, it is possible to avoid an increase in the weight of the lifting magnet and an increase in heat generation in the coil.

Also, in accordance with aspects of the present invention, where a plurality of magnetic field circuits are included in one magnetic pole unit and can be changed by appropriately switching them, the one magnetic pole unit can accommodate lifting of steel materials of various plate thicknesses.

A steel material conveying method according to aspects of the present invention will now be described.

Aspects of the present invention are applicable to methods for conveying steel materials in such places as steel works. Either of the lifting-magnet attachment magnetic pole unit and the steel-lifting magnetic-pole-equipped lifting magnet, according to the first and second embodiments described above, can be used here. For example, when a lifting-magnet attachment magnetic pole unit is used, the lifting-magnet attachment magnetic pole unit is attached to a typical lifting magnet and steel materials are lifted and conveyed with the magnetic force. When a magnetic-pole-equipped lifting magnet is used, steel materials are lifted and conveyed with the magnetic force of the lifting magnet. Specifically, by a steel material conveying apparatus, only one or more (e.g., two or three) intended pieces of steel plate waiting for a finishing step in a plate mill and waiting for shipment after the finishing step, can be lifted and moved from the storage area. In the case of the first embodiment, the steel material (e.g., steel plate) conveying apparatus may include, at an attracting portion for lifting of steel materials, a lifting magnet with the lifting-magnet attachment magnetic pole unit illustrated in FIG. 4 attached thereto or the magnetic-pole-equipped lifting magnet illustrated in FIG. 6. In the case of the second embodiment, the conveying apparatus may include, at an attracting portion for lifting of steel materials, a lifting magnet with the lifting-magnet attachment magnetic pole unit illustrated in FIGS. 9 and 10 attached thereto or the magnetic-pole-equipped lifting magnet illustrated in FIG. 11.

A steel plate manufacturing method according to aspects of the present invention will now be described.

Aspects of the present invention include a steel plate manufacturing method in which, by using the steel material conveying method which involves using the lifting-magnet attachment magnetic pole unit or the magnetic-pole-equipped lifting magnet according to the first and second embodiments, each or only some (e.g., two or three) intended pieces of steel plate stored in a steel plate storage place (storage area) after rolling are lifted and conveyed with magnetic force, and subjected to a finishing step.

For example, steel plates can be manufactured by heating a steel having a predetermined component composition, applying hot rolling to the steel, cooling the steel, and shearing the steel into a desired size. The component composition of the steel applicable to the steel plate manufacturing method according to aspects of the present invention is not particularly limited, and steel having a known component composition may be used. In the steel plate manufacturing method according to aspects of the present invention, heating and cooling temperature conditions and the rolling reduction ratio are not particularly limited, and known conditions can be employed.

EXAMPLES

Aspects of the present invention will now be described on the basis of Examples 1 to 4. Note that the present invention is not limited to Examples described below.

Example 1

Figure 7:
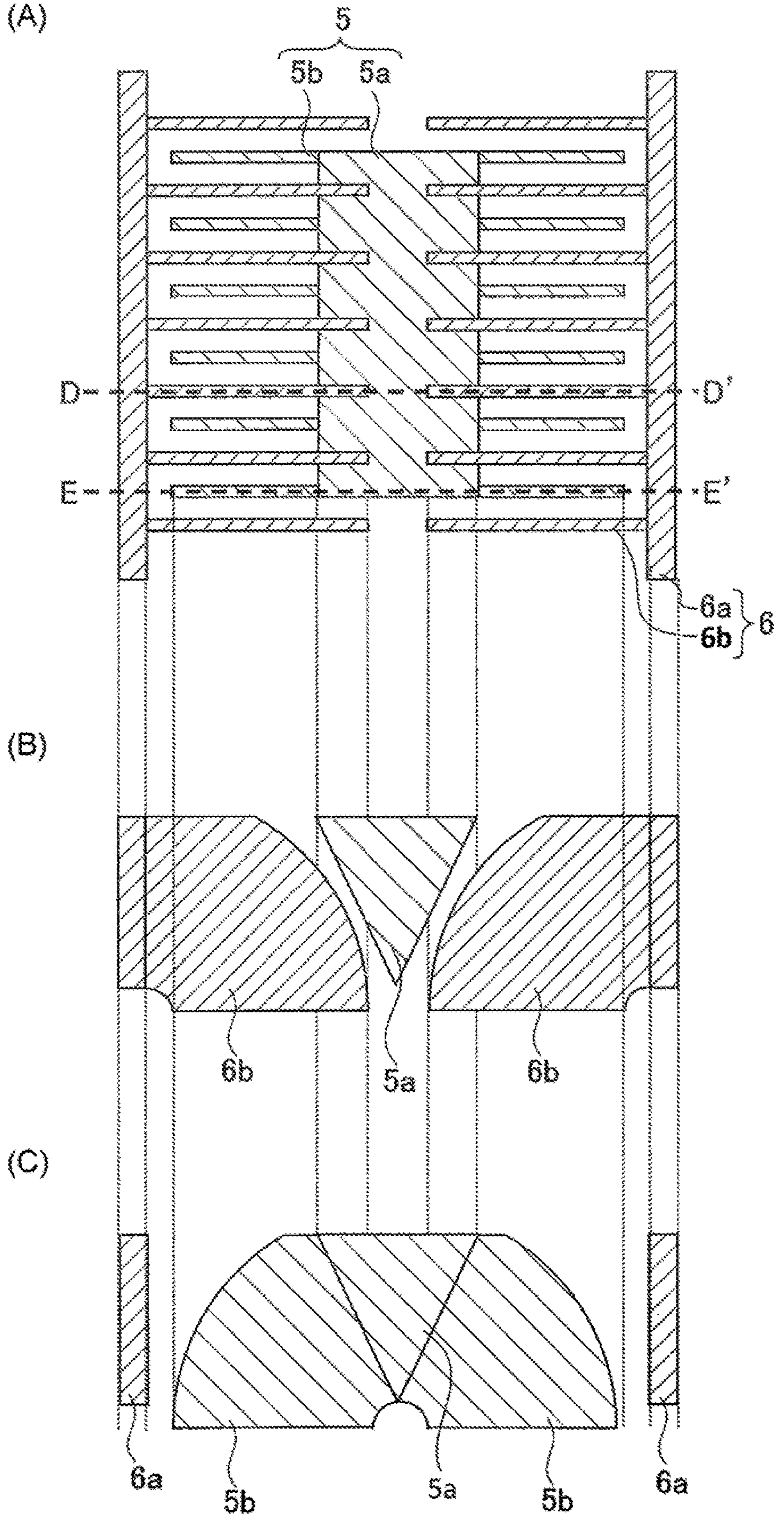
FIG. 7 illustrates a lifting-magnet attachment magnetic pole unit according to the first embodiment, used in Example 1.

FIG. 7 schematically illustrates a configuration of a lifting-magnet attachment magnetic pole unit according to the first embodiment of the present invention, used in Example 1. FIG. 7(A) is a plan view of the lifting-magnet attachment magnetic pole unit, as viewed from the underside, FIG. 7(B) is a cross-sectional view taken along line D-D' in FIG. 7(A), and FIG. 7(C) is a cross-sectional view taken along line E-E' in FIG. 7(A).

In Example 1, as an example of the present invention, a steel plate lifting test was performed using a magnetic-pole-equipped lifting magnet, such as that illustrated in FIG. 6, obtained by attaching the lifting-magnet attachment magnetic pole unit (made of SS400) according to aspects of the present invention illustrated in FIG. 7 to a lifting magnet (not shown) including an inner pole 150 mm in diameter and an outer pole 60 mm in thickness and 500 mm×500 mm in size. The magnetic pole unit is 10 mm thick, and the inner pole and the outer pole have a 20 mm gap therebetween. The dimensions of the first and second split magnetic poles are not particularly limited. As steel plates to be lifted, SS400 plates 5 mm in plate thickness, 3 m long×1.5 m wide, and weighing about 180 kg were used. Of ten steel plates stacked in layers, the uppermost piece (first plate) was attracted by the lifting magnet and attraction weight (attracting force) exerted on each steel plate was measured. The result of the measurement is shown in Table 1.

Table 1 shows that a large attracting force of 770 kgf was exerted on the first piece of plate at the top, whereas an attracting force exerted on the second piece of plate underneath was 110 kgf, an attracting force exerted on the third piece of plate underneath was 4 kgf, and an attracting force exerted on the fourth and subsequent pieces of plate further underneath was less than or equal to a measurement limit (0 kgf). The steel plates each weigh about 180 kg and this shows that the second and subsequent steel plates are not attracted.

Next, the first split magnetic pole 5 and the second split magnetic pole 6 of the magnetic pole unit described above were formed to have predetermined dimensions. With this magnetic pole unit attached to the lifting magnet described above, a steel plate lifting test was performed in the same manner as above.

The estimated mean magnetic flux density in the inner pole inside the coil was 1 T, and the saturation magnetic flux density of SS400 was about 2 T. Therefore, the cross-sectional area S ($mm^2$) of the inner pole inside the coil, the mean magnetic flux density B (T) in the inner pole inside the coil, the total perimeter L (mm) of a portion where the inner pole is in contact with a lifted steel material, the plate thickness t (mm) of the steel plate, and the saturation magnetic flux density $B_S$ (T) in the steel plate were S=17700 $mm^2$, B=1.0, L=4440 mm, t=5, and $B_S$=2.0 T, respectively. Substituting these values into the left and right sides of Inequality (1) gives S×B=17700 on the left side of Inequality (1) and L×t×$B_S$=44400 on the right side of Inequality (1). Inequality (1) is thus satisfied.

Steel plates were attracted by the magnetic-pole-equipped lifting magnet satisfying Inequality (1), and attraction weight (attracting force) exerted on each of the steel plates was measured. The result is shown in Table 1.

Table 1 shows that a large attracting force of 1800 kgf was exerted on the first piece of plate at the top, whereas an attracting force exerted on the second piece of plate underneath was 1 kgf, and an attracting force exerted on the third and subsequent pieces of plate further underneath was less than or equal to the measurement limit. The steel plates each weigh about 180 kg and this shows that the second and subsequent pieces of steel plate are not attracted.

As a conventional technique (comparative example), a lifting test was performed using only the lifting magnet same as that used in the examples of the present invention described above. The result is shown in Table 1. Table 1 shows that an attracting force of 670 kgf was exerted on the first piece of plate at the top. On the other hand, attraction weight (attracting force) exerted on the second piece of plate underneath was 300 kgf and attraction weight (attracting force) exerted on the third piece of plate underneath was 190 kgf. An attracting force exerted on the seventh and subsequent pieces of steel plate further underneath was less than or equal to the measurement limit. For example, steel plates measuring 3 m long×1.5 m wide each weigh about 180 kg. This shows that if steel plates to be lifted with the conventional technique described above are of a size smaller than this, the first to third pieces of plate at the top are attracted to the lifting magnet.

TABLE 1

| | Attraction Weight | | |
|---|---|---|---|
| | Lifting Magnet + Magnetic Pole Unit | | Lifting Magnet Only |
| Steel Plates | Magnetic Pole Unit with Split Magnetic Poles | Magnetic Pole Unit Satisfying Inequality (1) | (Conventional Technique) |
| 1st | 770 kgf | 1,800 kgf | 670 kgf |
| 2nd | 110 kgf | 1 kgf | 300 kgf |
| 3rd | 4 kgf | 0 kgf | 190 kgf |
| 4th | 0 kgf | 0 kgf | 100 kgf |
| 5th | 0 kgf | 0 kgf | 29 kgf |
| 6th | 0 kgf | 0 kgf | 2 kgf |
| 7th | 0 kgf | 0 kgf | 0 kgf |
| 8th | 0 kgf | 0 kgf | 0 kgf |
| 9th | 0 kgf | 0 kgf | 0 kgf |
| 10th | 0 kgf | 0 kgf | 0 kgf |
| Remarks | Example of Present Invention | Example of Present Invention | Comparative Example |

Example 1 shows that in the examples of the present invention described above, where substantially the entire magnetic flux produced by the coil is concentrated on the first plate, only the uppermost piece of ten pieces of steel plate stacked in layers can be lifted. A result similar to this can be obtained even when the lifting-magnet attachment magnetic pole unit is replaced by a magnetic-pole-equipped lifting magnet according to aspects of the present invention configured with the same dimensions.

Example 2

Figure 8:
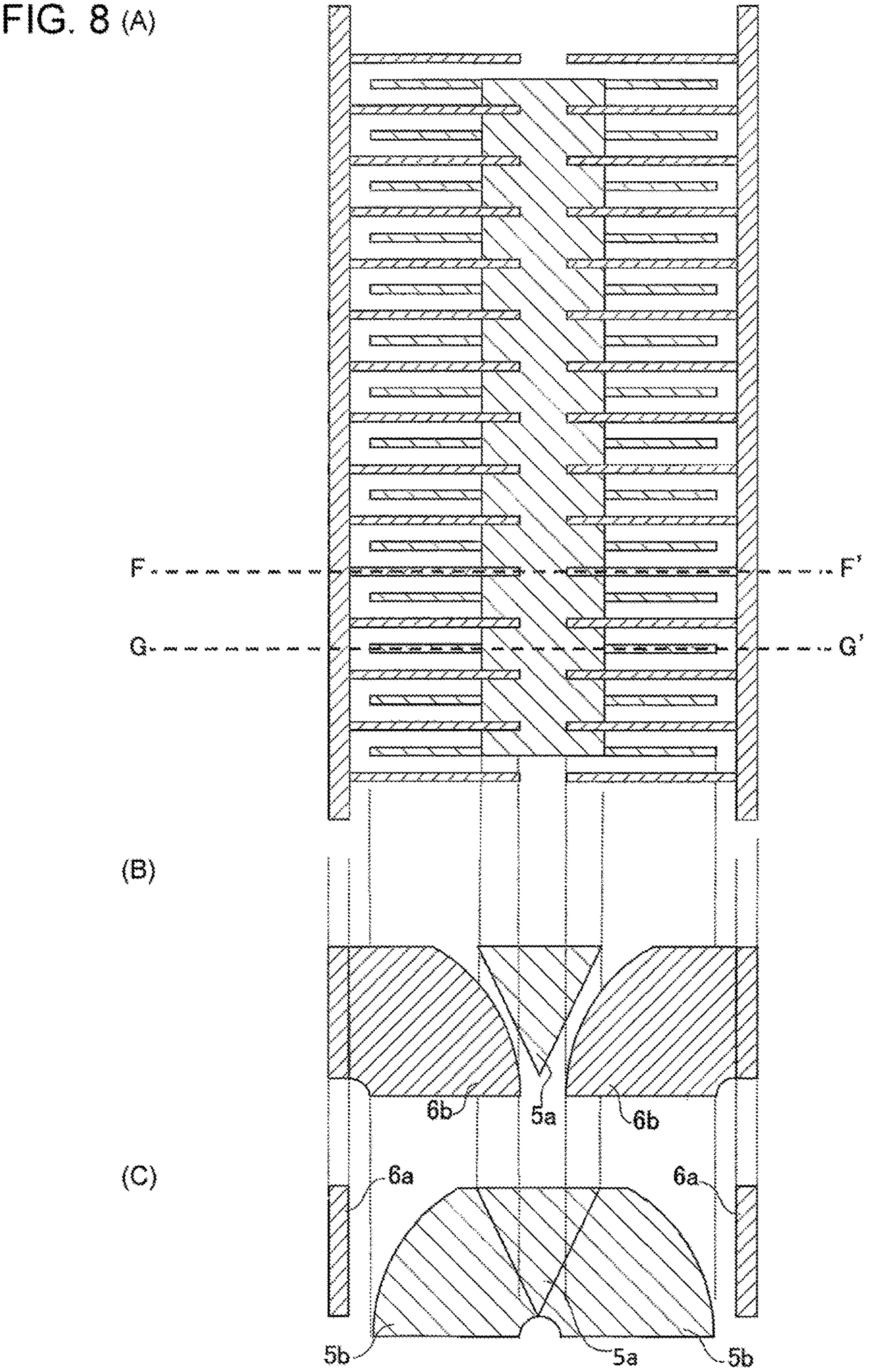
FIG. 8 illustrates a lifting-magnet attachment magnetic pole unit according to the first embodiment, used in Example 2.

FIG. 8 schematically illustrates a configuration of a lifting-magnet attachment magnetic pole unit according to the first embodiment, used in Example 2. FIG. 8(A) is a plan view of the lifting-magnet attachment magnetic pole unit, as viewed from the underside, FIG. 8(B) is a cross-sectional view taken along line F-F' in FIG. 8(A), and FIG. 8(C) is a cross-sectional view taken along line G-G' in FIG. 8(A).

In Example 2, as an example of the present invention, a steel plate lifting test was performed using a magnetic-pole-equipped lifting magnet, such as that illustrated in FIG. 6, obtained by attaching the lifting-magnet attachment magnetic pole unit (made of SS400) according to aspects of the present invention illustrated in FIG. 8 to a lifting magnet (not shown) including an inner pole 1000 mm×100 mm in size and an outer pole 60 mm in thickness and 1500 mm×500 mm in size. The magnetic pole unit is 20 mm thick, and the inner pole and the outer pole have a 30 mm gap therebetween. The dimensions of the first and second split magnetic poles are not particularly limited. As steel plates to be lifted, SS400 plates 10 mm in plate thickness, 3 m long×3 m wide, and weighing about 720 kg were used. Of ten steel plates stacked in layers, the uppermost piece (first plate) was drawn by the lifting magnet and attraction weight (attracting force) exerted on each steel plate was measured. The result of the measurement is shown in Table 2.

Table 2 shows that a large attracting force of 3800 kgf was exerted on the first piece of plate at the top, whereas an attracting force exerted on the second piece of plate underneath was 540 kgf, an attracting force exerted on the third plate underneath was 5 kgf, and an attracting force exerted on the fourth and subsequent pieces of plate further underneath was less than or equal to a measurement limit (0 kgf). The steel plates each weigh about 720 kg and this shows that the second and subsequent pieces of steel plate underneath are not attracted.

Next, the first and second split magnetic poles 5 and 6 of the magnetic pole unit described above were formed to have sides of Inequality (1) gives S×B=100000 on the left side and L×t×$B_S$=218000 on the right side. Inequality (1) is thus satisfied.

Steel plates were attracted by the lifting magnet satisfying Inequality (1), and attraction weight (attracting force) exerted on each of the steel plates was measured. The result is shown in Table 2.

Table 2 shows that a large attracting force of 8500 kgf was exerted on the first piece of plate at the top, whereas an attracting force exerted on the second piece of plate underneath was 5 kgf and an attracting force exerted on the third and subsequent plates further underneath was less than or equal to the measurement limit. The steel plates each weigh about 720 kg and this shows that the second and subsequent pieces of steel plate are not attracted.

As a conventional technique (comparative example), a lifting test was performed using only the lifting magnet same as that used in the examples of the present invention described above. The result is shown in Table 2. Table 2 shows that an attracting force of 3300 kgf was exerted on the first plate at the top. On the other hand, attraction weight (attracting force) exerted on the second piece of plate underneath was 1500 kgf and attraction weight (attracting force) exerted on the third piece of plate underneath was 900 kgf. An attracting force exerted on the eighth and subsequent pieces of steel plates further underneath was less than or equal to the measurement limit. In the conventional technique, for example, steel plates measuring 3 m long×3 m wide each weigh about 720 kg. This shows that if steel plates to be lifted with the conventional technique described above are of a size smaller than this, the first to third pieces of plate at the top are attracted to the lifting magnet.

TABLE 2

| | Attraction Weight | | |
|---|---|---|---|
| | Lifting Magnet + Magnetic Pole Unit | | Lifting Magnet Only |
| Steel Plates | Magnetic Pole Unit with Split Magnetic Poles | Magnetic Pole Unit Satisfying Inequality (1) | (Conventional Technique) |
| 1st | 3,800 kgf | 8,500 kgf | 3,300 kgf |
| 2nd | 540 kgf | 5 kgf | 1,500 kgf |
| 3rd | 5 kgf | 0 kgf | 900 kgf |
| 4th | 0 kgf | 0 kgf | 520 kgf |
| 5th | 0 kgf | 0 kgf | 150 kgf |
| 6th | 0 kgf | 0 kgf | 8 kgf |
| 7th | 0 kgf | 0 kgf | 1 kgf |
| 8th | 0 kgf | 0 kgf | 0 kgf |
| 9th | 0 kgf | 0 kgf | 0 kgf |
| 10th | 0 kgf | 0 kgf | 0 kgf |
| Remarks | Example of Present Invention | Example of Present Invention | Comparative Example |

predetermined dimensions. With this magnetic pole unit attached to the lifting magnet described above, a steel plate lifting test was performed in the same manner as above.

The estimated mean magnetic flux density in the inner pole inside the coil was 1 T, and the saturation magnetic flux density of SS400 was about 2 T. Therefore, the cross-sectional area S ($mm^2$) of the inner pole inside the coil, the mean magnetic flux density B (T) in the inner pole inside the coil, the total perimeter L (mm) of the portion where the inner pole is in contact with the lifted steel material, the plate thickness t (mm) of the steel plate, and the saturation magnetic flux density $B_S$ (T) in the steel plate were S=100000 $mm^2$, B=1.0, L=10900 mm, t=10, and $B_S$=2.0 T, respectively. Substituting these values into the left and right Example 2 shows that in the examples of the present invention described above, where substantially the entire magnetic flux produced by the coil is concentrated on the first plate, only the uppermost piece of ten steel plates stacked in layers can be lifted. A result similar to this can be obtained even when the lifting-magnet attachment magnetic pole unit is replaced by a magnetic-pole-equipped lifting magnet according to aspects of the present invention configured with the same dimensions.

Example 3

In Example 3, the lifting-magnet attachment magnetic pole unit according to the second embodiment of the present invention, illustrated in FIG. 9, was used.

In Example 3, as an example of the present invention, a steel plate lifting test was performed using the magnetic-pole-equipped lifting magnet, illustrated in FIG. 11(A), obtained by attaching the lifting-magnet attachment magnetic pole unit (made of SS400) illustrated in FIG. 9 to a lifting magnet (not shown) including an inner pole 100 mm in diameter and an outer pole 25 mm in thickness and 350 mm×350 mm in size.

The first and second split magnetic poles 5 and 6 are 10 mm thick, and the first and second split magnetic poles 5 and 6 have a 10 mm gap therebetween. The first and second split magnetic poles 5 and 6 are designed to lift one piece of plate at the top. The fixed magnetic pole 9 is circular in shape and is 100 mm in diameter. The fixed magnetic pole 9 is designed to lift three pieces of steel material at the top. The magnetic field circuit was switched by moving the movable magnetic poles 8 with a linear slider.

The fixed magnetic pole 9 is configured to have dimensions that satisfy Inequality (2). The estimated mean magnetic flux density in the inner pole inside the coil was 1 T, and the saturation magnetic flux density of SS400 was about 2 T. Therefore, the cross-sectional area S ($mm^2$) of the inner pole inside the coil, the mean magnetic flux density B (T) in the inner pole inside the coil, the total perimeter $L_1$ (mm) of a portion where the fixed magnetic pole 9 is in contact with a lifted steel material, the maximum sum $t_1$ (mm) of the plate thicknesses of steel plates lifted by the fixed magnetic pole 9, and the saturation magnetic flux density $B_S$ (T) in the steel plates were S=7850 $mm^2$, B=1.0, $L_1$=2950 mm, $t_1$=15 mm, and $B_S$=2.0 T, respectively. Substituting these values into the left and right sides of Inequality (2) gives S×B=78500 on the left side of Inequality (2) and $L_1 \times t_1 \times B_S$=88500 on the right side of Inequality (2). The Inequality (2) is thus satisfied.

As steel materials to be lifted, SS400 materials with 5 mm in plate thickness, 3 m long by 3 m wide, and weighing 340 kg were used. In the test, five pieces of steel material stacked in layers were attracted by the lifting magnet and attraction weight (attracting force) exerted on each steel plate was measured. The result of the measurement is shown in Table 3.

The left column of Table 3 shows the measurement result of lifting with the first and second split magnetic poles 5 and 6 and the fixed magnetic pole 9, whereas the right column of Table 3 shows the measurement result of lifting with only the fixed magnetic pole 9. Table 3 shows that in the case of lifting with the first and second split magnetic poles 5 and 6 and the fixed magnetic pole 9, a large attracting force of 3800 kgf was exerted on the first plate at the top, whereas an attracting force exerted on the second piece of plate underneath was 1 kgf and an attracting force exerted on the third and subsequent pieces of plate further underneath was less than or equal to the measurement limit (0 kgf). In the case of lifting with only the fixed magnetic pole 9, an attracting force exerted on the first piece of plate at the top was 1370 kgf, an attracting force exerted on the second piece of plate underneath was 600 kgf, an attracting force exerted on the third piece of plate underneath was 490 kgf, an attracting force exerted on the fourth piece of plate underneath was 2 kgf, and an attracting force exerted on the fifth piece of plate underneath was less than or equal to the measurement limit (0 kgf). This shows that magnetic flux saturation occurs in the first piece of plate and the magnetic flux penetrates to the third piece of plate, so that three steel materials are attracted.

TABLE 3

| | Attraction Weight | |
|---|---|---|
| | Lifting Magnet + Magnetic Pole Unit | |
| Steel Plates | First and Second Split Magnetic Poles and Fixed Magnetic Pole | Fixed Magnetic Pole |
| 1st | 3,806 kgf | 1,369 kgf |
| 2nd | 1 kgf | 595 kgf |
| 3rd | 0 kgf | 494 kgf |
| 4th | 0 kgf | 2 kgf |
| 5th | 0 kgf | 0 kgf |
| Remarks | Example of Present Invention | Example of Present Invention |

Example 3 shows that by switching the magnetic field circuit with the movable magnetic poles 8, the number of steel plates that can be lifted with only one magnetic-pole-equipped lifting magnet can be controlled between one and three. Although no measurement result is shown, if, in the case of lifting with only the fixed magnetic pole 9, the control described above is combined with the control of current applied to the coil, lifting of two plates is also possible.

Example 4

In Example 4, the lifting-magnet attachment magnetic pole unit according to the second embodiment of the present invention, illustrated in FIG. 10, was used.

In Example 4, as an example of the present invention, a steel plate lifting test was performed using the magnetic-pole-equipped lifting magnet, illustrated in FIG. 11(A), obtained by attaching the lifting-magnet attachment magnetic pole unit (made of SS400) illustrated in FIG. 10 to a lifting magnet (not shown) including an inner pole 100 mm in diameter and an outer pole 25 mm in thickness and 350 mm×350 mm in size.

The first and second split magnetic poles 5 and 6 are 10 mm thick, and the first and second split magnetic poles 5 and 6 have a 10 mm gap therebetween. The first and second split magnetic poles 5 and 6 are designed to lift one piece of plate at the top. The fixed magnetic pole 9 is split into two separate rectangles, which are 20 mm thick. Each separate portion of the fixed magnetic pole 9 and the second branch 6*c* adjacent thereto have a 10 mm gap therebetween. The fixed magnetic pole 9 is designed to lift two pieces of steel material at the top. The magnetic field circuit was switched by moving the movable magnetic poles 8 with a linear slider.

The fixed magnetic pole 9 is configured to have dimensions that satisfy Inequality (2). The estimated mean magnetic flux density in the inner pole inside the coil was 1 T, and the saturation magnetic flux density of SS400 was about 2 T. Therefore, when the cross-sectional area S ($mm^2$) of the inner pole inside the coil is 7850 $mm^2$, the mean magnetic flux density B (T) in the inner pole inside the coil is 1.0, and the total perimeter of a portion where the fixed magnetic pole 9 is in contact with a lifted steel material is $L_1$ (mm), then the total perimeter of a portion where the first split magnetic pole 5 is in contact with the steel material is 3180 mm, the total perimeter of the portion where the fixed magnetic pole 9 is in contact with the steel material is 540 mm, and the maximum sum $t_1$ (mm) of the plate thicknesses of steel plates lifted by the fixed magnetic pole is 10 mm. Substituting these values into the left and right sides of Inequality (2) gives S×B=7850 on the left side of Inequality (2) and $L_1 \times t_1 \times B_S$=10800 on the right side of Inequality (2). The Inequality (2) is thus satisfied.

As steel materials to be lifted, SS400 materials 5 mm in plate thickness, 3 m long by 3 m wide, and weighing 340 kg were used. In the test, five steel materials stacked in layers were drawn by the lifting magnet and the amount of attraction (attracting force) exerted on each steel plate was measured. The result of the measurement is shown in Table 4.

The left column of Table 4 shows the measurement result of lifting with the first and second split magnetic poles 5 and 6 and the fixed magnetic pole 9, whereas the right column of Table 4 shows the measurement result of lifting with only the fixed magnetic pole 9. Table 4 shows that in the case of lifting with the first and second split magnetic poles 5 and 6 and the fixed magnetic pole 9, a large attracting force of 3800 kgf was exerted on the first plate at the top, whereas an attracting force exerted on the second plate underneath was 1 kgf and an attracting force exerted on the third and subsequent plates underneath was less than or equal to the measurement limit (0 kgf). In the case of lifting with only the fixed magnetic pole 9, an attracting force exerted on the first plate at the top was 1530 kgf, an attracting force exerted on the second plate underneath was 700 kgf, an attracting force exerted on the third plate underneath was 3 kgf, and an attracting force exerted on the fourth and subsequent plates underneath was less than or equal to the measurement limit (0 kgf). This shows that magnetic flux saturation occurs in the first plate and the magnetic flux penetrates to the second plate, so that two steel materials are attracted.

TABLE 4

| | Attraction Weight | |
|---|---|---|
| | Lifting Magnet + Magnetic Pole Unit | |
| Steel Plates | First and Second Split Magnetic Poles and Fixed Magnetic Pole | Fixed Magnetic Pole |
| 1st | 3,802 kgf | 1,528 kgf |
| 2nd | 1 kgf | 698 kgf |
| 3rd | 0 kgf | 3 kgf |
| 4th | 0 kgf | 0 kgf |
| 5th | 0 kgf | 0 kgf |
| Remarks | Example of Present Invention | Example of Present Invention |

Example 4 shows that by switching the magnetic field circuit with the movable magnetic poles 8, the number of steel plates that can be lifted with only one magnetic-pole-equipped lifting magnet can be controlled between one and two.

REFERENCE SIGNS LIST

2: inner pole
3: outer pole
4: coil
5: first split magnetic pole
**5*a***: first shaft
**5*b***: first branch
6: second split magnetic pole
**6*a***: second shaft
**6*b***: second branch
**6*c***: second branch
7: magnetic-pole-equipped lifting magnet
8: movable magnetic pole
9: fixed magnetic pole
101: lifting magnet inner pole
102: lifting magnet outer pole
103: coil
111: lifting magnet inner pole
112: lifting magnet outer pole
113: neck portion
121: lifting magnet inner pole
122: lifting magnet outer pole
123: neck portion
131: lifting magnet inner pole
132: lifting magnet outer pole
**133*a* to 133*d***: steel material
134: magnetic flux
141: lifting magnet inner pole
142: lifting magnet outer pole
**143*a* to 143*d***: steel material
144: magnetic flux

The invention claimed is:

1. A lifting-magnet attachment magnetic pole unit for a lifting magnet used to lift and convey a steel material with magnetic force, the lifting-magnet attachment magnetic pole unit comprising:

a first split magnetic pole in contact with an iron core of the lifting magnet, the first split magnetic pole having a branched structure; and a second split magnetic pole in contact with a yoke of the lifting magnet, the second split magnetic pole having a branched structure, wherein the first and second split magnetic poles are alternately arranged, and wherein the first split magnetic pole has dimensions satisfying Inequality (1):

$$S \times B < L \times t \times B_S \qquad \text{Inequality (1)}$$

where

S is a cross-sectional area ($mm^2$) of an inner pole of the lifting magnet;

B is a mean magnetic flux density (T) inside the inner pole of the lifting magnet;

L is a total perimeter (mm) of the first split magnetic pole in a region where the first split magnetic pole is in contact with a lifted steel material;

t is a plate thickness (mm) of the lifted steel material; and $B_S$ is a saturation magnetic flux density (T) in the lifted steel material.

2. The lifting-magnet attachment magnetic pole unit according to claim 1, wherein a distance between the first and second split magnetic poles alternately arranged is 30 mm or less.

3. The lifting-magnet attachment magnetic pole unit according to claim 2, wherein the first and second split magnetic poles each have a plate thickness of 20 mm or less.

4. The lifting-magnet attachment magnetic pole unit according to claim 1, wherein the first and second split magnetic poles each have a plate thickness of 20 mm or less.

5. A steel-lifting magnetic-pole-equipped lifting magnet used to lift and convey a steel material with magnetic force, the steel-lifting magnetic-pole-equipped lifting magnet comprising, as the magnetic pole, the lifting-magnet attachment magnetic pole unit according to claim 1.

6. A steel material conveying method using the steel-lifting magnetic-pole-equipped lifting magnet according to claim 5, the steel material conveying method comprising lifting and conveying a steel material with magnetic force.

7. A steel material conveying method using the lifting-magnet attachment magnetic pole unit according to claim 1, the steel material conveying method comprising attaching the lifting-magnet attachment magnetic pole unit to a lifting magnet, and lifting and conveying a steel material with magnetic force.

8. A steel plate manufacturing method comprising conveying a steel plate using the steel material conveying method according to claim 7 after rolling, and carrying out a finishing step.

9. The lifting-magnet attachment magnetic pole unit according to claim 1, wherein the first split magnetic pole includes at least one movable magnetic pole and a fixed magnetic pole in a region adjacent to the movable magnetic pole, the fixed magnetic pole being disposed on a surface in contact with the steel material.

10. The lifting-magnet attachment magnetic pole unit according to claim 9, wherein the fixed magnetic pole has dimensions satisfying Inequality (2):

$$S \times B < L_1 \times t_1 \times B_S \qquad \text{Inequality (2)}$$

where

S is a cross-sectional area ($mm^2$) of an inner pole of the lifting magnet;

B is a mean magnetic flux density (T) inside the inner pole of the lifting magnet;

$L_1$ is a total perimeter (mm) of the fixed magnetic pole in a region where the fixed magnetic pole is in contact with a lifted steel material;

$t_1$ is a maximum sum (mm) of plate thicknesses of steel materials lifted by the fixed magnetic pole; and $B_S$ is a saturation magnetic flux density (T) in the lifted steel materials.

11. The lifting-magnet attachment magnetic pole unit according to claim 1, wherein a distance between the first and second split magnetic poles alternately arranged is 30 mm or less.

12. The lifting-magnet attachment magnetic pole unit according to claim 1, wherein the first and second split magnetic poles each have a plate thickness of 20 mm or less.

13. A lifting-magnet attachment magnetic pole unit for a lifting magnet used to lift and convey a steel material with magnetic force, the lifting-magnet attachment magnetic pole unit comprising:

a first split magnetic pole in contact with an iron core of the lifting magnet, the first split magnetic pole having a branched structure; and a second split magnetic pole in contact with a yoke of the lifting magnet, the second split magnetic pole having a branched structure, wherein the first and second split magnetic poles are alternately arranged, and wherein the first split magnetic pole includes at least one movable magnetic pole and a fixed magnetic pole in a region adjacent to the movable magnetic pole, the fixed magnetic pole being disposed on a surface in contact with the steel material.

14. The lifting-magnet attachment magnetic pole unit according to claim 13, wherein the movable magnetic pole is of a movable type.

15. The lifting-magnet attachment magnetic pole unit according to claim 13, wherein the fixed magnetic pole has dimensions satisfying Inequality (2):

$$S \times B < L_1 \times t_1 \times B_S \qquad \text{Inequality (2)}$$

where

S is a cross-sectional area ($mm^2$) of an inner pole of the lifting magnet;

B is a mean magnetic flux density (T) inside the inner pole of the lifting magnet;

$L_1$ is a total perimeter (mm) of the fixed magnetic pole in a region where the fixed magnetic pole is in contact with a lifted steel material;

$t_1$ is a maximum sum (mm) of plate thicknesses of steel materials lifted by the fixed magnetic pole; and $B_S$ is a saturation magnetic flux density (T) in the lifted steel materials.

16. The lifting-magnet attachment magnetic pole unit according to claim 15, wherein a distance between the first and second split magnetic poles alternately arranged is 30 mm or less.

17. The lifting-magnet attachment magnetic pole unit according to claim 15, wherein the first and second split magnetic poles each have a plate thickness of 20 mm or less.

18. The lifting-magnet attachment magnetic pole unit according to claim 13, wherein a distance between the first and second split magnetic poles alternately arranged is 30 mm or less.

19. The lifting-magnet attachment magnetic pole unit according to claim 13, wherein the first and second split magnetic poles each have a plate thickness of 20 mm or less.

* * * * *